(12) United States Patent
Tatera et al.

(10) Patent No.: US 10,254,771 B2
(45) Date of Patent: Apr. 9, 2019

(54) SYSTEM AND METHOD FOR DISPENSING A BEVERAGE

(71) Applicant: Pat's Backcountry Beverages, Inc., Golden, CO (US)

(72) Inventors: Patrick J. Tatera, Talkeetna, AK (US); Randal Bertuccelli, Mount Aukum, CA (US); Joe Molinari, San Rafael, CA (US)

(73) Assignee: Pat's Backcountry Beverages, Inc.

( * ) Notice: Subject to any disclaimer, the term of this patent is extended or adjusted under 35 U.S.C. 154(b) by 377 days.

(21) Appl. No.: 14/830,426

(22) Filed: Aug. 19, 2015

(65) Prior Publication Data

US 2016/0288064 A1 Oct. 6, 2016

Related U.S. Application Data

(60) Provisional application No. 62/143,552, filed on Apr. 6, 2015.

(51) Int. Cl.
| | | |
|---|---|---|
| *B01F 3/08* | (2006.01) | |
| *G05D 11/03* | (2006.01) | |
| *G05D 11/00* | (2006.01) | |
| *B67D 1/00* | (2006.01) | |
| *B67D 1/02* | (2006.01) | |
| *B67D 1/12* | (2006.01) | |

(52) U.S. Cl.
CPC ........... *G05D 11/03* (2013.01); *B67D 1/0031* (2013.01); *B67D 1/025* (2013.01); *B67D 1/1231* (2013.01); *G05D 11/005* (2013.01)

(58) Field of Classification Search
CPC .... B67D 1/025; B67D 1/0031; B67D 1/1231; G05D 11/03; B01F 3/0876; B01F 3/04808; B01F 15/0416
USPC ........................................................ 99/323.2
See application file for complete search history.

(56) References Cited

U.S. PATENT DOCUMENTS

| | | | | |
|---|---|---|---|---|
| 2,566,436 A | * | 9/1951 | Waite .................... | G07F 13/065 |
| | | | | 222/129.2 |
| 2,655,858 A | * | 10/1953 | Hamlin .................... | B67B 7/28 |
| | | | | 194/240 |

(Continued)

FOREIGN PATENT DOCUMENTS

| | | |
|---|---|---|
| CN | 102827717 A | 12/2012 |
| GB | 2 420 553 A | 5/2006 |

*Primary Examiner* — Jimmy Chou
(74) *Attorney, Agent, or Firm* — Cooley LLP

(57) ABSTRACT

Systems, apparatus and methods are described herein for dispensing a carbonated beverage. In some embodiments, an apparatus includes a first cylinder that defines an interior region that can contain a volume of carbonated water and a first piston separating the interior region. A second cylinder is coupled to the first cylinder and defines an interior region and a second piston separating the interior region and operatively coupled to the first piston. The interior region of the second cylinder can contain a volume of beverage concentrate. A flywheel assembly is operatively coupled to the first cylinder and to the first piston and can control a predetermined ratio of a volume of carbonated water from the first cylinder and a volume of beverage concentrate from the second cylinder to be dispensed when a force is exerted on the piston by a flow of carbonated water through the first cylinder.

13 Claims, 22 Drawing Sheets

(56) References Cited

U.S. PATENT DOCUMENTS

| | | | |
|---|---|---|---|
| 3,960,066 A | * | 6/1976 | LaRocco .................. A23L 2/54 99/323.2 |
| 4,216,711 A | | 8/1980 | Skoli et al. |
| 4,390,035 A | | 6/1983 | Hill |
| 4,737,037 A | | 4/1988 | Mojonnier |
| 4,779,761 A | | 10/1988 | Rudick et al. |
| 4,934,567 A | | 6/1990 | Vahjen et al. |
| 5,476,193 A | | 12/1995 | Haynes |

* cited by examiner

100

SYSTEM AND METHOD FOR DISPENSING A BEVERAGE

CROSS-REFERENCE TO RELATED APPLICATIONS

This application claims priority to and the benefit of U.S. Provisional Patent Application No. 62/143,552 entitled "System and Method for Dispensing a Beverage," filed Apr. 6, 2015, the disclosure of which is incorporated herein by reference in its entirety.

BACKGROUND

Embodiments described herein relate generally to beverage dispensing devices, and more particularly to systems, devices, and methods for dispensing a carbonated beverage having a particular ratio of concentrate to carbonated water.

Typically, draft beer is stored in and dispensed from kegs; however, the use of kegs can present many challenges to brewers, distributors, bars, and restaurants in the implementation of draft beer systems. For example, kegs can be difficult to ship due to their heavy weight, especially when filled. Additionally, kegs are typically expensive to clean. Kegs typically need to be stored in refrigeration rooms and require cooled dispensing lines, such as, for example, glycol chilling lines, in order to dispense beer at desired temperatures. Refrigeration rooms and glycol chilling systems can be expensive and can require a large amount of space and energy, particularly when used in a restaurant or bar. Additionally, kegs typically require diligent care to maintain desired beer carbonation levels and to keep the dispensing lines clean. Thus, there is a need for a beer dispensing system that can be easily operated and maintained and that utilizes ingredients that can be economically transported and stored.

The production of concentrated beer, which is now available, opens up new distribution, storage, and delivery options, similar to how soft drink manufacturers benefit from having soft drink beverages available as a syrup inside a "bag-in-box" configuration. Dispensing beer concentrate from a "bag-in-box" eliminates many of the problems associated with kegs of beer. Concentrated beer is shelf stable without refrigeration, and can be packaged in lightweight disposable containers rather than heavy kegs.

Traditional soda fountain machines make it easy to dispense soft-drink concentrates to customers. However, soda fountain machines are not ideal for dispensing concentrated beer. Typical soda fountain machines operate at high pressures, which can cause beer to become overly foamy when dispensed. Additionally, it is difficult to maintain exact calibrations of syrup to carbonated water ratios in soda fountain machines, which can result in inconsistencies of quality. Depending on the calibrations of individual soda fountain machines, some dispensed beers can be "richer" and others can be "thinner" in flavor profile. Some known fountain machines also mix the soda syrup and carbonated water directly at the specialized head of the dispensing equipment as the soda syrup and carbonated water exit the machine, which results in a visual experience that is dissimilar to the visual experience achieved when beer is dispensed from a keg through a traditional draft beer tap.

It is therefore desirable to have a concentrate dispensing system that precisely dispenses a predetermined ratio of concentrate and carbonated water in a manner that supports the traditional dispensing presentation of a stock draft beer tap. It is further desired that this system be able to function independent of electrical connections, thus simplifying the installation of the equipment and offering greater diversity of applications.

SUMMARY

Systems, apparatus and methods are described herein for dispensing a carbonated beverage, such as, for example, beer or soda. In some embodiments, an apparatus includes a first cylinder that defines a first interior region and a second interior region separated by a first piston. The first cylinder is configured to be coupled to a source of carbonated water. The first interior region and the second interior region of the first cylinder are each configured to alternatingly contain a first volume of carbonated water and a second volume of carbonated water, respectively. A second cylinder is coupled to the first cylinder and defines a first interior region and a second interior region separated by a second piston. The second piston is operatively coupled to the first piston. The second cylinder is configured to be coupled to a source of beverage concentrate. The first interior region and the second interior region of the second cylinder are each configured to alternatingly receive a first volume of beverage concentrate and a second volume of beverage concentrate, respectively. A flywheel assembly is operatively coupled to the first piston. The flywheel assembly can control a predetermined ratio of a volume of carbonated water from the first cylinder to a volume of beverage concentrate from the second cylinder to be simultaneously dispensed from the first cylinder and from the second cylinder, respectively, when a force is exerted on the piston by a flow of carbonated water through the first cylinder.

DETAILED DESCRIPTION

Systems, apparatus and methods for dispensing a carbonated beverage, such as a soda or a beer, are described herein. A beverage dispensing system described herein includes a dispensing device disposed within a containment unit or drawer that can be coupled to, for example, a bottom side of a bar or countertop to be coupled to a dispensing tap. For example, the beverage dispensing system can be coupled to an existing dispensing machine that includes a soda-gun, or a lever-type tap, such as those typically used to dispense beer and/or soda. The dispensing device of the beverage dispensing system includes a mechanical metering control pump that utilizes a flywheel assembly to operate in synchronized coordination two pistons each disposed within a different cylinder, but operatively coupled together. The dispensing unit can be coupled to a source of carbonated water and a source of beverage concentrate (e.g., beer or soda concentrate) and can operate to dispense a predetermined or preset ratio of the carbonated water to beverage concentrate to be mixed prior to being received at the dispensing tap. For example, the dispensing device can blend or mix beer concentrates with carbonated water, and dispense the finished (mixed) beer through a standard (traditional) draft beer tap.

In some embodiments, the flywheel can control inlet/outlet valve positions of the first cylinder, which direct the pressurized carbonated water into/out of the top/bottom interior regions of the cylinder that are divided by a movable piston. The flywheel assembly provides a clocking mechanism by which the valve positions can be manipulated. In operation, the volume of carbonated water flowing through the system is controlled, in part, by displacement of the piston, which causes the flywheel assembly to be actuated to open/close the inlet/outlet valves.

In some embodiments, a beverage dispensing system as described herein can be powered solely by the force (e.g., pressure) provided by the flow of carbonated water through the dispensing device. In other words, no electrical connection is required. In such an embodiment, the beverage concentrate can be cooled using ice contained within a container or drawer that can hold the beverage concentrate therein. In alternative embodiments, a beverage dispensing system can include a self-contained refrigeration system or can be configured to be coupled to an existing refrigeration system, for example, at an establishment using the beverage dispensing system, such as, a restaurant or bar.

Figure 1:
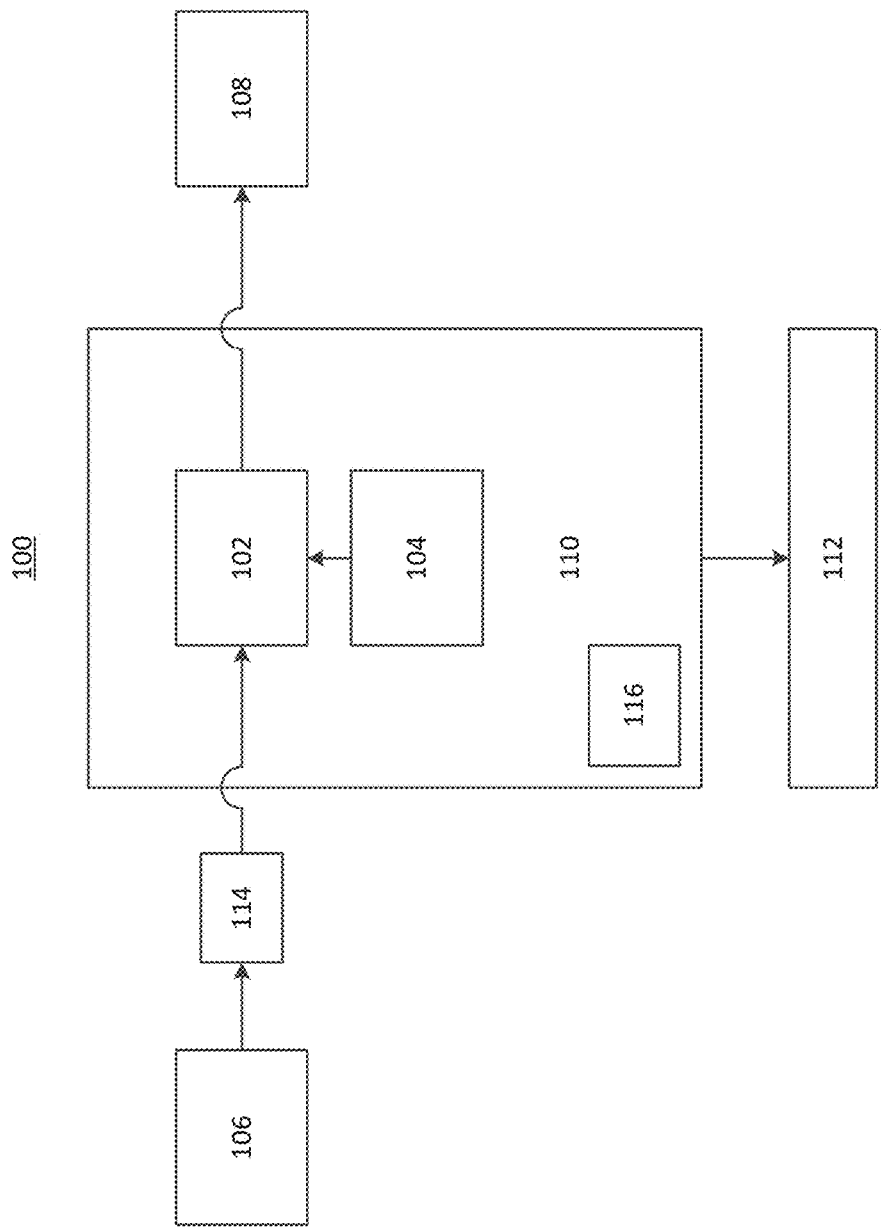
FIG. 1 is a schematic illustration of a beverage dispensing system, according to an embodiment.
Figure 2:
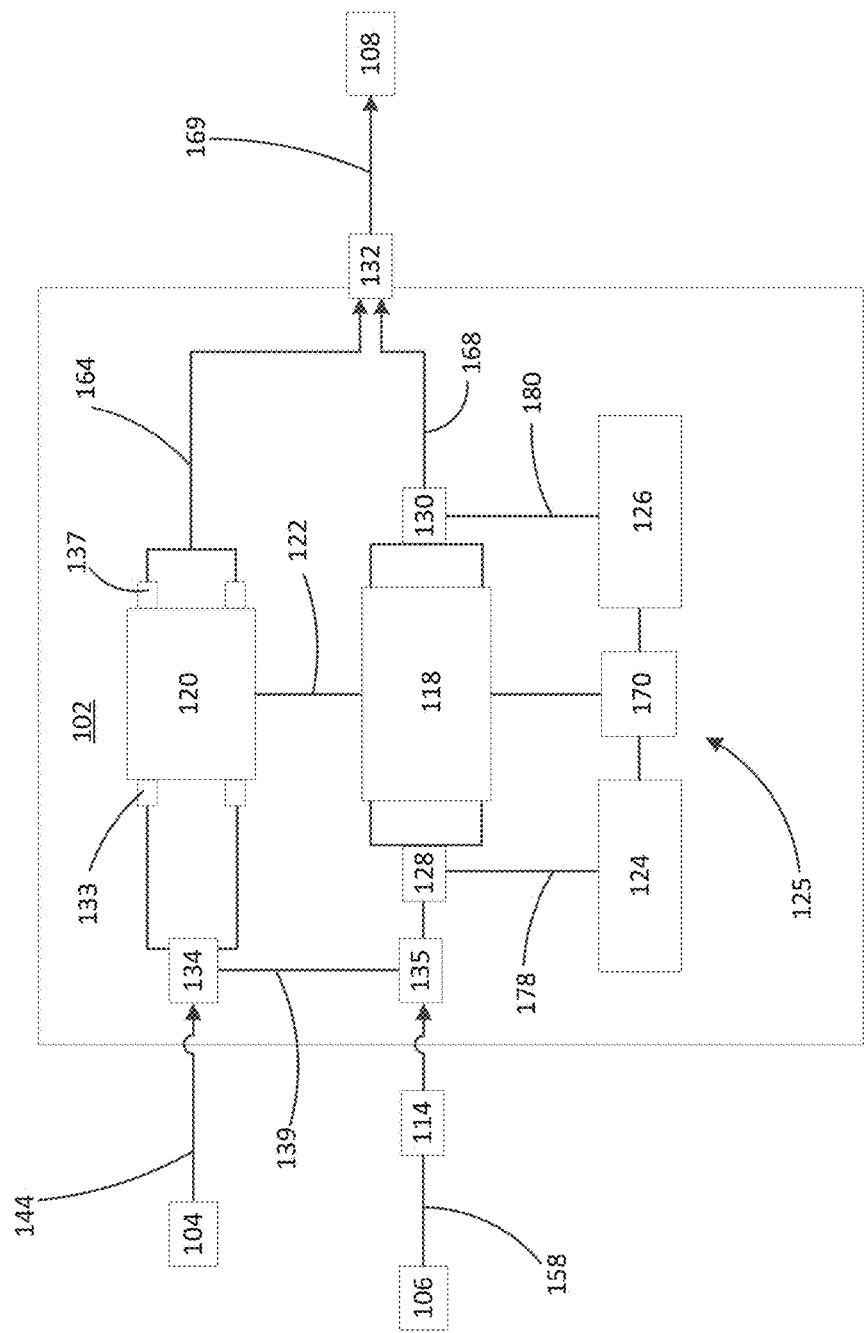
FIG. 2 is a schematic illustration of a portion of the beverage dispensing system of FIG. 1.

FIGS. 1 and 2 are schematic illustrations of a beverage dispensing system 100 according to an embodiment. The beverage dispensing system 100 (also referred to herein as "system" or "dispensing system") includes a dispensing device 102 that can be fluidically coupled to a source of beverage concentrate 104 and fluidically coupled to a source of carbonated water 106. The dispensing device 102 can also be coupled to a dispensing tap 108, such as, for example, a dispensing tap used to dispense soda or beer. The dispensing device 102 is configured to receive carbonated water from the source of carbonated water 106 and to draw concentrate from the source of beverage concentrate 104. The dispensing device 102 can output a mixture of the carbonated water and beverage concentrate according to a predetermined concentrate-to-carbonated water ratio. The mixture can flow out of the system 100 via the dispensing tap 108.

The source of beverage concentrate 104 can include one or more pre-filled containers of beverage concentrate. The beverage concentrate can be a beer concentrate, a soda syrup concentrate, or any other liquid concentrate suitable for mixing with carbonated water to produce a liquid carbonated beverage. The pre-filled concentrate container(s) can be, for example, a flexible bag, bag-in-box, or any other packaging suitable for containing a beverage concentrate. In some embodiments, the system 100 can include more than one pre-filled container of beverage concentrate. Each pre-filled concentrate container can include a connector coupled thereto that can be used to connect the pre-filled container to the dispensing device 102 via a concentrate intake line 144 (see, e.g., FIG. 2). For example, the connector can include a valve having an open position and a closed position. A user can select to open the valve coupled to only one of the available concentrate containers (e.g., if there are multiple concentrate containers) such that the concentrate is drawn only from that selected concentrate container. As that container is emptied during use, the user can select a different concentrate container in which the concentrate is to be drawn. In this manner, the user can control the order in which the concentrate is drawn from the available concentrate containers. As a result, the concentrate containers can be emptied and replaced individually without interrupting the operation of the system. Alternatively, a user can select to open more than one or all of the available concentrate containers. In such a case, the concentrate can flow from all of the open concentrate containers. In some embodiments, the connector coupled to the concentrate container(s) can include a one-way valve that is opened via pressure applied by a corresponding connecting element (not shown) attached to the concentrate intake line 144.

Any viable source of pressurized carbonated water can be used as the source of carbonated water 106. For example, in a restaurant environment, a carbonator often manufactures carbonated water on-site and delivers the carbonated water through a standard soda-gun or fountain drink machine. This existing supply of carbonated water could be used as the source of carbonated water 106. Alternatively, the source of carbonated water 106 can be a self-contained source coupled to the dispensing device 102. In some embodiments, the carbonated water can be chemically generated by allowing carbon dioxide produced from an effervescent reaction to saturate into a contained vessel of water. The carbonated water can be delivered from the source of carbonated water 106 to the dispensing device 102 via a carbonated water intake line 158 (see, e.g. FIG. 2). In some embodiments, the source of carbonated water 106 can be refrigerated in order to provide the carbonated water to the dispensing device 102 at a desired temperature. The pressurized carbonated water provides the mechanical force required to operate the system 100 as described in more detail below.

The system 100 also includes a containment unit 110 (also referred to herein as "drawer") that defines an interior region in which the dispensing device 102 and the beverage concentrate container(s) 104 can be disposed. The drawer 110 can also accommodate space for ice to be added to the drawer 110, such that the concentrate(s) can be kept cold without refrigeration. The drawer 100 can be mounted or stacked under, for example, a bar or counter top. In addition, more than one drawer 110 (including a dispensing unit and one or more concentrate containers) can be stacked vertically under the bar or counter top.

The carbonated water delivered from the source of carbonated water 106 through the carbonated water intake line 158 can enter the drawer 110 via an opening oriented for convenience relative to the source of carbonated water. An exhaust line 169 (see, e.g., FIG. 2) carrying the blended beverage (e.g., the mixed carbonated water and concentrate) can be oriented leaving the drawer 110 such that it minimizes the distance the mixed beverage (e.g., beer) must travel to reach the tap 108. The carbonated water outlet line 168 should be insulated to keep the beverage cold. Ideally, the tap 108 would be mounted directly above the drawer 110, and the drawer 110 would be insulated tightly against the bottom of the tap tower such that the tap itself can remain cold from convection with the ice within the interior of the drawer 110.

During operation of the system 100, the ice within the drawer 110 can be replenished as needed in order to maintain the temperature within the interior region of the drawer, and thus the beverage concentrate, within a desired range. The desired temperature range within the drawer can be dependent on, for example, the preferred beverage temperature of the consumer and/or the manufacturer of the concentrate. For example, a typical desired temperature of a carbonated beverage flowing from a tap 108 is 32 degrees Fahrenheit. However, some concentrates are associated with a beverage having a desired temperature ranging from 42 to 50 degrees Fahrenheit, while other concentrates are associated with a beverage having a desired temperature of less than 32 degrees Fahrenheit. In some alternative embodiments, a refrigeration unit can be used instead of ice to maintain the low or desired temperature within the drawer 110. For example, an existing refrigeration unit at the location in which the system 100 is used can be used. In some embodiments, the system 100 can include a self-contained refrigeration unit (not shown).

A temperature indicator 116 can be coupled to the drawer 110 and used to monitor the temperature within the interior region of the drawer 110. The temperature indicator 116 can include a display on the outer surface of the drawer 110 that displays the temperature inside of the drawer 110. The temperature indicator 116 can also include a temperature alarm that indicates when the temperature of the interior region of the drawer 110 is outside of a pre-set desired temperature range. The temperature alarm can be, for example, battery operated or can be electricity powered. In some embodiments, the temperature alarm can be operatively engaged with a solenoid-type valve (not shown). When the temperature of the interior region of the drawer 110 is outside of a desired range, the temperature alarm can be activated to engage the solenoid-type valve and cause the solenoid-type valve to automatically stop the flow of the beverage being dispensed. As a result, the beverage cannot be served outside of the pre-set desired temperature range.

A drain tray 112 can be arranged below the drawer 110 and used to collect liquid that accumulates within the drawer 110. For example, the drawer 110 can include a sloped bottom surface that defines a drain opening and the drain tray 112 can be disposed beneath the drain opening such that liquid within the drawer 110, such as, for example, melted ice, can flow toward the drain opening and into the drain tray 112 rather than accumulate in the drawer 110. The drain tray 112 can include a drain line through which the liquid collected in the drain tray 112 can be directed from the drain tray 112 to, for example, a sink or an external drain. In some embodiments, more than one drawer 110 may be used (as described in more detail below), each containing its own dispensing unit and one or more beverage concentrate containers. In such a case, each drawer can include a drain opening as described above. The drawers can be vertically stacked such that each drawer can drain into the drawer below it, and the bottom drawer can drain into the drain tray 112.

The dispensing device 102 provides a metering/control pump, that includes two piston/cylinder assemblies that are joined together, and operate in synchronized coordination with each other. Specifically, as shown in FIG. 2, the dispensing device 102 includes a first cylinder 118, a second cylinder 120, and a piston rod 122. The piston rod 122 is operatively coupled to the first cylinder 118 and the second cylinder 120. The piston rod 122 is also operatively coupled to a dual flywheel assembly 125 that includes a first flywheel 124 and a second flywheel 126.

The first cylinder 118 and the second cylinder 120 can be operatively coupled together by the piston rod 122. The piston rod 122 can include a single piston rod that is coupled to a first piston (not shown in FIGS. 1 and 2) movably disposed in the first cylinder 118 and a second piston (not shown in FIGS. 1 and 2) movably disposed in the second cylinder 120. For example, the first and second cylinders 118, 120 can be joined vertically by sharing the same "through" piston rod. Alternatively, the cylinders 118, 120 can be operatively connected in an alternate orientation to each other by other mechanical means. For example, the cylinders 118, 120 can be disposed side-by-side. In some embodiments, an intermediate piston rod (not shown) can be operatively coupled between the pistons of the respective first and second cylinders 118, 120.

The first cylinder 118 can operate to meter the flow of pressurized carbonated water through the system 100. The second cylinder 120 can meter the flow of beverage (e.g., beer) concentrate through the system 100. The ratio of the displacement volumes of these two cylinders 118, 120 can be such that each "stroke" (up or down) of the two pistons (within the first cylinder 118 and the second cylinder 120) can deliver an exactly uniform ratio of the two liquids (e.g., carbonated water and beverage concentrate (e.g., beer concentrate)). These ratios are designed to regulate the dispensed volumes of the two liquids (beer concentrate and carbonated water) based upon the particular concentrate's level of concentration. For example, a 1:6 concentrate of beer (one part beer makes 6 parts finished beverage) would require 5× the volume of carbonated water for every 1× of volume of beer concentrate.

The piston rod 122 extends externally from the two cylinders 118, 120 and is coupled to the dual flywheel assembly 125 via a hinged arm 170. The flywheel assembly 125 provides a clocking mechanism that is oriented in a rotationally specific position based upon where the piston within the first cylinder 120 is at relative to its up/down cycle. The first flywheel 124 is connected to an inlet valve 128 via a valve stem 178 and the second flywheel 126 is coupled to an outlet valve 130 via a valve stem 180. The valve stems 178, 180 move up or down within grooves or "tracks" (not shown in FIGS. 1 and 2) within the corresponding flywheel 124, 126. These grooves govern the vertical position of the valve stems 178, 180 such that the two valves 128, 130 can be controlled vertically to regulate the path of fluid entering and exiting the carbonated water cylinder, i.e., first cylinder 118. For example, raised portions within the grooves on the flywheel 124, 126 can be engaged by a wheel coupled to the valve stems 178, 180. The raised portions can cause the valve stems 178, 180 to be moved vertically up when engaged by the wheels of the valve stems 178, 180 as described in more detail below with reference to beverage dispensing system 200. The positioning of the valves 128, 130 can be precisely controlled by the orientation of the respective flywheel 124, 126, which is precisely controlled by the piston rod 122, and hence the position of the piston (within the first cylinder 118) within its "stroke" or cycle. The valves 128, 130 are timed such that when carbonated water is entering the top of the cylinder (above the piston), it is being exhausted from the bottom of the cylinder (below the piston), and vice versa. Further details about the operation of the flywheel assembly 125 and valves 128, 130 are described below. The dispensing device 102 can be contained within a protective box or housing (not shown in FIGS. 1 and 2) to avoid objects interfering with its moving parts.

Although the valve stems 178, 180 are described as moving within grooves or tracks within the corresponding flywheels 124, 126, in other embodiments the valve stems 178, 180 can be operatively engaged with raised surfaces (not shown) on an outer perimeter surface of corresponding flywheels 124, 126. The valve stems 178, 180 can be biased toward the surfaces of the corresponding flywheels 124, 126 by a spring force, resulting in the valves 128, 130 being biased toward their "down" positions. When the valve stems 178, 180 operatively engage the raised surfaces, the raised surfaces can push the valve stems 178, 180 against the spring force, causing the valves 128, 130 to move into "up" positions.

The piston within the second cylinder 120 moves in tandem with the piston within the first cylinder 118 as carbonated water flows through the first cylinder 118 exerting a force on the piston. Thus, as the piston within the first cylinder 118 moves through its stroke, so too does the piston within the second cylinder 120. The regulated difference of displacement volumes between the pistons within the cylinders 118 and 120 can be controlled, for example, by the diameter of the respective cylinders 118, 120.

The beverage concentrate (e.g., beer concentrate) is not under pressure, and is drawn into the second cylinder 120 via vacuum generated by the movement of the piston within the second cylinder 120. Inlet ports 133 are coupled to the second cylinder 120 above and below the piston and can include one way valves (e.g., duck bill, umbrella, spring-check valve, etc.) that allow fluid flow into the second cylinder 120, but not out. Outlet ports 137 are coupled to the second cylinder 120 above and below the piston and can include one way valves that only allow fluid flow out of the second cylinder 120. Thus, as the piston travels up and down within the second cylinder 120 under the power of the piston within the first cylinder 118, a metered volume of concentrate is pumped into and out of the second cylinder 120. Although not specifically shown, the pistons, valves, and connections throughout the dispensing device 102 can be sealed with appropriate O-rings and sealing materials to maintain a pressure and liquid tight seal where required.

During operation of the dispensing device 102, there is a brief moment at the top and bottom of the pistons' stroke/cycle where the valves 128, 130 are in the same position (e.g., both are in the up position or both are in the down position). As a result, the carbonated water will flow into and out of the cylinder 118 on the same side of the piston, which can potentially cause a "stall out" of the dispensing device 102. For example, when the piston rod 122 is at the bottom position of the cycle, both of the valves 128, 130 are in the down position, allowing carbonated water to flow into the first cylinder 118 above the piston and to flow out of the portion of the interior of the first cylinder 118 above the piston. In this position, no carbonated water is able to enter the first cylinder 118 below the piston in order to push the piston upward and continue the operation of the dispensing device 102. To address this, a magnet or series of magnets can be integrated into the flywheel assembly 125, such that as the piston rod 122 reaches one of its "stall out" positions (full up position, or full down position), magnet(s) attached to the flywheels 124, 126 and/or attached to other support structure (described in more detail below) help to pull the flywheels 124, 126 through their "stuck" or "stall out" positions. Regardless of which surface holds the magnets, the partnered surface can include a matching "magnetized" object that is attracted to the helper magnet, and drawn to it. In this manner, the assembly can start/stop in a controlled fashion, without need for the flywheels to carry momentum. As an alternative to positioning the magnet(s) in an orientation that utilizes attractive forces, magnet(s) can be integrated such that a repulsive force is harnessed for the purpose of helping the flywheels 124, 126 move through the "stuck" positions.

As an alternative to the use of magnets, one or more springs can be used. For example, two springs can be connected to the flywheels 124, 126, such that during these "stall out" positions, the force of the springs can help to carry the rotation of the flywheels 124, 126 forward, and hence the piston through its cycle, and overcome the stall out effect created by having both valves 128, 129 in the same position. In some embodiments, a combination of springs or magnets that are oriented to create either attractive or repulsive forces upon the corresponding features of the dispensing device 102 can be used either alone, or in concert with each other to ensure the "smooth" and continuous operation of the device and to prevent it from stalling out.

In operation, the system 100 is driven by the pressurized carbonated water flowing from the source of carbonated water 106. The carbonated water exits the first cylinder 118 via an outlet line 168 and the concentrate exits the second cylinder 120 via an outlet line 164. The outlet line 168 and the outlet line 164 are both coupled to a mixing member 132. The mixing member 132 can be any suitable apparatus for combining the carbonated water and concentrate flowing from the respective cylinders 118, 120. For example, the mixing member 132 can be a T-connector or a Y-connector. The mixing member 132 can include an internal component that promotes fluid mixing, such as is found in mixing nozzles. After flowing through the mixing member 132, and when the tap 108 is in the open position, the combined concentrate and carbonated water can flow through exhaust line 169 to the tap 108 and out of the system 100.

In some embodiments, the system 100 can also include a liquid pressure regulator 114 coupled to the carbonated water intake line 158 between the source of carbonated water 106 and the dispensing device 102. The carbonated water flowing from the source of carbonated water 106 passes through the liquid pressure regulator 114 before flowing into the dispensing device 102. The liquid pressure regulator 114 can regulate the pressure of the carbonated water entering the dispensing device 102 such that the pressure of the mixture of carbonated water and concentrate exiting the tap 108 is within a desired pressure range. For example, the pressure of the incoming carbonated water provided by the source may be too high and require reduction, which can be achieved by the liquid pressure regulator. For example, when the system 100 is used to dispense beer, it may be desirable to regulate the pressure of the carbonated water entering the dispensing device 102 to limit or prevent foaming of the beer as it exits a dispensing tap 108. Although shown in FIG. 1 as being located outside of the drawer 110, the liquid pressure regulator 114 can alternatively be located within the interior region of the drawer 110. In some embodiments, a liquid pressure regulator may be coupled to the exhaust line 169 flowing from the dispensing device 102 to the tap 108 in addition to or as an alternative to the liquid pressure regulator 114 coupled to the carbonated water intake line 158.

The pressure of carbonated water produced by existing commercial systems typically ranges from about 20 to about 80 psi, with about 60 psi being the target pressure for dispensed soda. The pressure of fluid entering the dispensing device 102 can be selected to achieve a particular flow rate exiting the tap 108. The typical target flow rate for beer, for example, is about 2 ounces per second. The target pressure for the carbonated water entering the system 100 to achieve this flow rate can range, for example, from about 5 psi to about 20 psi, and in some cases from about 10 psi to about 12 psi. The system 100 can be used for both soda and beer applications, and the liquid pressure regulator 114 can be used to reduce the pressure of the carbonated water to the appropriate range for the desired application.

The tap 108 can be any suitable device that is capable of controlling the flow of fluid out of the system 100 from the dispensing device 102. For example, the tap 108 can be a traditional beverage tap, such as a draft beer tap. The tap 108 can include an open position and a closed position. When in the open position, the system 100 is in an operative state driven by the pressurized carbonated water (as described in more detail below). When in the closed position, the system 100 is in an inoperative state. In the inoperative state, the flow of concentrate and the flow of carbonated water within the system 100 stops and no fluid flows out of the system 100 via the tap 108.

The system 100 can optionally include diversion or purge valves that can be used to purge the concentrate from the second cylinder 120. For example, if a user wants to clean the second cylinder 120 or flush the second cylinder 120 such that a different concentrate can be used, the purge valves can be actuated. Specifically, a control valve 134 can be coupled to the concentrate intake line 144 between the source of concentrate 104 and the second cylinder 120. The control valve 134 can be actuated to divert the flow of fluid to travel through either the top or the bottom inlet port 133 of the second cylinder 120. The control valve 134 can include any suitable device for controlling the flow of fluid between, for example, two inlets and two outlets, such as, for example a three or four-way valve. A purge valve 135 can be coupled to the carbonated water intake line 158 and can be, for example, mounted to the drawer 110, disposed outside the drawer 110, or disposed inside the drawer 110. A purge line 139 is connected between the purge valve 135 and the control valve 134 as shown in FIG. 2.

During normal operation of the system 100, the control valve 134 is in a first configuration that allows the flow of concentrate between the source of concentrate 104 and the two inlet ports 133 of the second cylinder 120, and the purge valve 135 is in a first position that allows the flow of carbonated water only to the first cylinder 118. During a flushing operation of the system 100, the control valve 134 is moved to a second configuration to block the flow of concentrate from the source of concentrate 104 from flowing to the second cylinder 120 and allow carbonated water to flow from the purge line 139, through the control valve 134 and into the concentrate intake line 144. The purge valve 135 can be actuated to allow carbonated water to flow through the purge line 139 and through the concentrate flow path (e.g., to the control valve 134 and intake line 144). In this manner, a concentrate can be disconnected from the system, and the entire concentrate flow path can be purged with carbonated water. By alternatingly diverting this carbonated water through the top and bottom input ports 133 of the second cylinder 120 (e.g., the concentrate cylinder), while opening the tap 108, the user can watch the blended beverage exit the tap 108 until it is clear carbonated water, indicating that all of the concentrate (e.g., beer concentrate) within the system has been "flushed". Then the diversion valves (134, 135) can be closed, and a new style of concentrate (e.g., beer concentrate) can be added to the system if desired.

A serving counter (not shown) can be installed on moving parts of the dispensing device 102, such that the total number of servings dispensed from the tap 108 can be counted. The total number of servings can be displayed, for example, on the front of the drawer 110. The serving counter can be mechanical or electrical. Like the odometer on a car, the serving counter can be manually reset to zero. By counting how many servings of a beverage are dispensed through the tap 108, regularly scheduled maintenance can be performed on the dispensing device 102 at designated intervals.

The cylinders 118, 120 of the dispensing system 100 can be any size so long as the cylinders 118, 120 are scaled properly to output the desired concentrate-to-carbonated water ratio. For example, the cylinders 118, 120 can be sized such that one full down stroke of the piston 122 results in the tap 108 dispensing one serving of a beverage (e.g., a 16-ounce beer), and one full up stroke of the piston 122 results in the tap 108 dispensing a second serving of a beverage. Alternatively, the cylinders 118, 120 can be scaled to be smaller, so that one full down stroke of the piston 122 results in a half serving or a quarter serving being dispensed from the tap 108. In an embodiment where one full down stroke results in the tap 108 dispensing a quarter serving of a beverage, the piston 122 would need to move through a full cycle (i.e., a full down and up stroke) twice for the dispensing device 102 to dispense one serving.

In order to facilitate the blending of additional liquid streams, additional piston/cylinder assemblies can be included in the dispensing system 100 in a similar way to the concentrate cylinder 120. By either extending the piston rod 122 to support another "inline" cylinder, by driving additional cylinders off of a shared flywheel, or by other mechanical attachment to any of the moving parts of the dispensing system 100, additional cylinders can be added to the system 100. The additional cylinder(s) can be used to add alcohol, hop extracts, fruit flavors, and/or other flavors that enhance or modify the flavor profile of a beer or soda. The fluid in the additional cylinder(s) can be added to the dispensing system 100 by being pumped through the additional cylinder(s) in the same way the concentrate is pumped through the concentrate cylinder 120 (via an array of check valves that govern the forward flow of the liquid).

Figure 5:
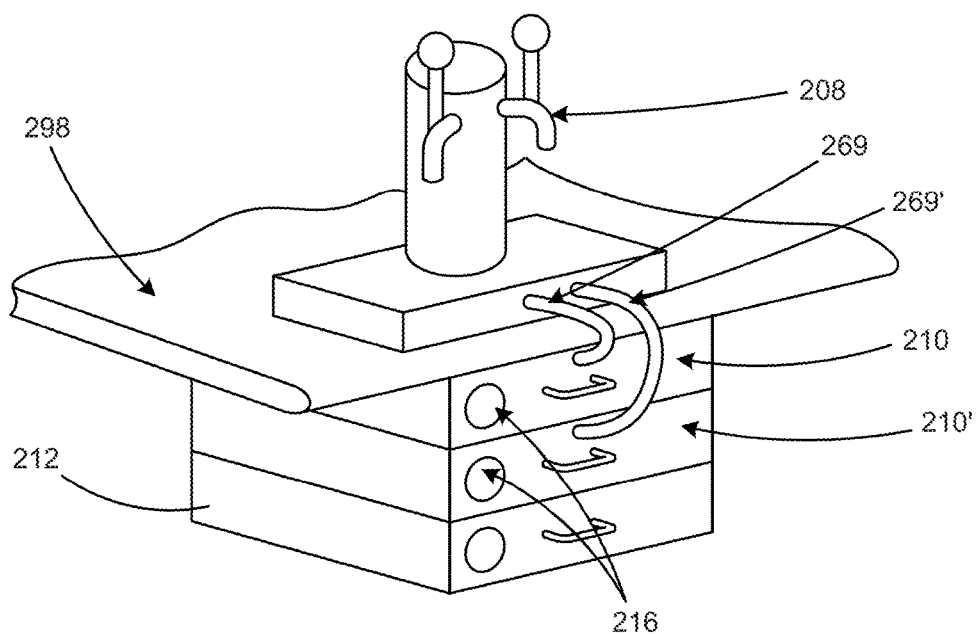
FIG. 5 is a perspective view of the beverage dispensing system of FIG. 3 shown mounted to a counter and coupled to a dispensing tap, along with a second beverage dispensing system.

FIGS. 3-21 illustrate a beverage dispensing system according to another embodiment. A beverage dispensing system 200 (also referred to herein as "system" or "dispensing system") includes a dispensing device 202 (also referred to herein as "dispenser") that is fluidically coupled to three beverage concentrate containers 204 and fluidically coupled to a source of carbonated water (not shown). The system 200 can include the same as or similar features and/or functions as described above for dispensing system 100, and therefore, certain features and functions may not be described below in detail with respect to system 200. The system 200 also includes a containment unit 210 (also referred to herein as "drawer" or "container") that defines an interior region 205 in which the dispensing device 202 and the beverage concentrate container(s) 204 are disposed. The drawer 210 can also accommodate space for ice to be added to the drawer 210, such that the concentrate(s) can be kept cold without refrigeration. The drawer 210 can include a lid (not shown) that can be removed or opened to gain access to the interior of the drawer 210 to turn valves coupled to the concentrate containers 204 on and off and/or to replace concentrate containers, etc. The drawer 210 can be mounted or stacked under, for example, a bar or counter top 298 as shown in FIG. 5. In addition, as described above, more than one drawer 210 (including a dispensing unit 202 and one or more concentrate containers 204) can be stacked vertically under the bar or counter top. For example, as shown in FIG. 5, a second drawer 210' is shown coupled below the drawer 210.

A drain tray 212 can be arranged below the drawer 210 and used to collect liquid that accumulates within the drawer 210 (and 210'). For example, the drawer 210 can include a sloped bottom surface 292 that defines a drain opening 290 and the drain tray 212 can be disposed beneath the drain opening 290 such that liquid within the drawer 210, such as, for example, melted ice, can flow toward the drain opening and into the drain tray 212 rather than accumulate in the drawer 210. The drain tray 212 can include a drain line 294 through which the liquid collected in the drain tray 212 can be directed from the drain tray 212 to, for example, a sink or an external drain (not shown).

The system 200 can be coupled to a dispensing tap 208 as shown in FIG. 5, such as, for example, a dispensing tap used to dispense soda or beer. As with the previous embodiment, the dispensing device 202 is configured to receive carbonated water from the source of carbonated water and to draw concentrate from the beverage concentrate containers 204. The dispensing device 202 can output a mixture of the carbonated water and beverage concentrate according to a predetermined concentrate-to-carbonated water ratio. The mixture can flow out of the system 200 via an exhaust line 269 to the dispensing tap 208 as described above for system 200.

The beverage concentrate can be, for example, a beer concentrate, a soda syrup concentrate, or any other liquid concentrate suitable for mixing with carbonated water to produce a liquid carbonated beverage. The beverage concentrate containers 204 can be, for example, a flexible bag, bag-in-box, or any other packaging suitable for containing a beverage concentrate. Each concentrate container can include a connector (not shown) coupled thereto that can be used to connect the concentrate container 204 to the dispensing device 202 via a concentrate intake line 244. For example, the connectors can include a valve having an open position and a closed position and a user can select to open one or more of the valves such that the concentrate is drawn only from that selected concentrate container(s) 204 in the same manner as described above.

As described above, the source of carbonated water (not shown) can be any viable source of pressurized carbonated water existing at the establishment in which the system 200 is used, or can be a self-contained source coupled to the dispensing device 202. The carbonated water can be delivered from the source of carbonated water to the dispensing device 202 via a carbonated water intake line 258 (see, e.g. FIG. 3). In some embodiments, the source of carbonated water 206 can be refrigerated in order to provide the carbonated water to the dispensing device 202 at a desired temperature. The pressurized carbonated water provides the mechanical force required to operate the system 200 as described previously and as described in more detail below.

The carbonated water delivered from the source of carbonated water through the carbonated water intake line 258 can enter the drawer 210 via an opening 296 oriented for convenience relative to the source of carbonated water. The outlet or exhaust line 269 (see, e.g., FIG. 3) carrying the blended beverage (e.g., the mixed carbonated water and concentrate) can be oriented leaving the drawer 210 through an opening 295 such that it minimizes the distance the mixed beverage (e.g., beer) must travel to reach the tap 208. The outlet line 269 should be insulated to keep the beverage cold. Ideally, the tap 208 would be mounted directly above the drawer 210 as shown in FIG. 5, and the drawer 210 would be insulated tightly against the bottom of the tap tower such that the tap itself can remain cold from convection with the ice within the interior of the drawer 210.

A temperature indicator 216 can be coupled to the drawer 210 and used to monitor the temperature within the interior region 205 of the drawer 210. The temperature indicator 216 can include a display on the outer surface of the drawer 210 that displays the temperature inside of the drawer 210. The temperature indicator 216 can also include a temperature alarm that indicates when the temperature of the interior region 205 of the drawer 210 is outside of a desired range. The temperature alarm can be, for example, battery operated or can be electricity powered. As described above, in some embodiments, the temperature alarm can be operatively engaged with a solenoid-type valve (not shown). When the temperature of the interior region 205 of the drawer 210 is outside of a desired range, the temperature alarm can be activated to engage the solenoid-type valve and cause the solenoid-type valve to automatically stop the flow of the beverage being dispensed. As a result, the beverage cannot be served outside of the pre-set desired temperature range.

The system 200 can also include a liquid pressure regulator (not shown) coupled to the carbonated water intake line 258 between the source of carbonated water and the dispensing device 202. As described above, the carbonated water flowing from the source of carbonated water passes through the liquid pressure regulator before flowing into the dispensing device 202 and can regulate the pressure of the carbonated water entering the dispensing device 202. The liquid pressure regulator can be disposed outside the drawer 210, attached to the drawer 210 or disposed within the interior region 205 of drawer 210. In some embodiments, a liquid pressure regulator may be coupled to the outlet line 269 flowing from the dispensing device 202 to the tap 208 in addition to or as an alternative to the liquid pressure regulator coupled to the carbonated water intake line.

Figure 3:
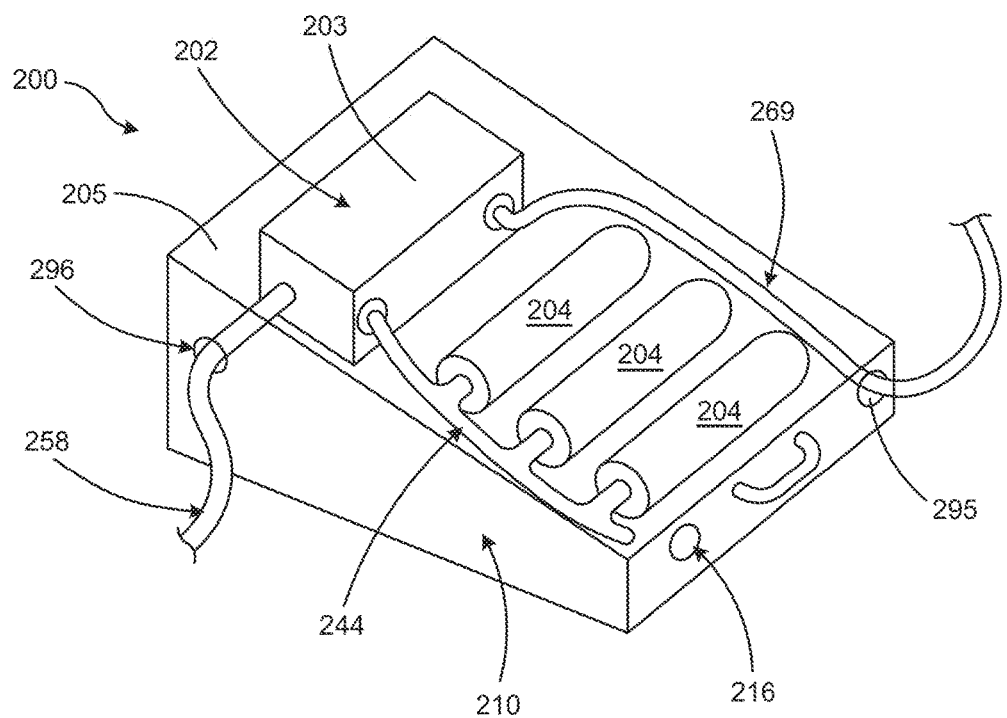
FIG. 3 is a perspective view of a beverage dispensing system, according to another embodiment.
Figure 4:
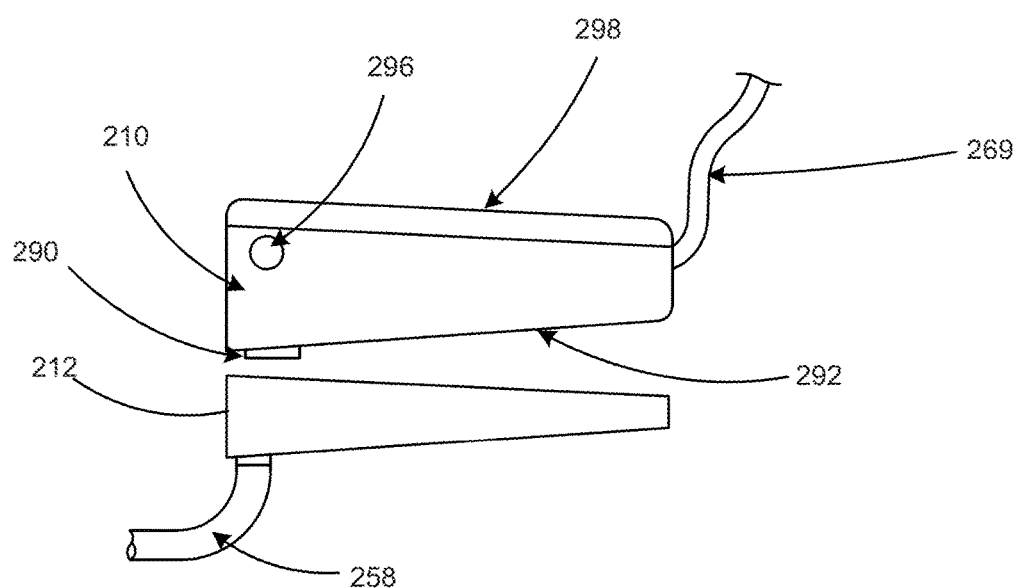
FIG. 4 is a side view of the beverage dispensing system of FIG. 3.
Figure 6:
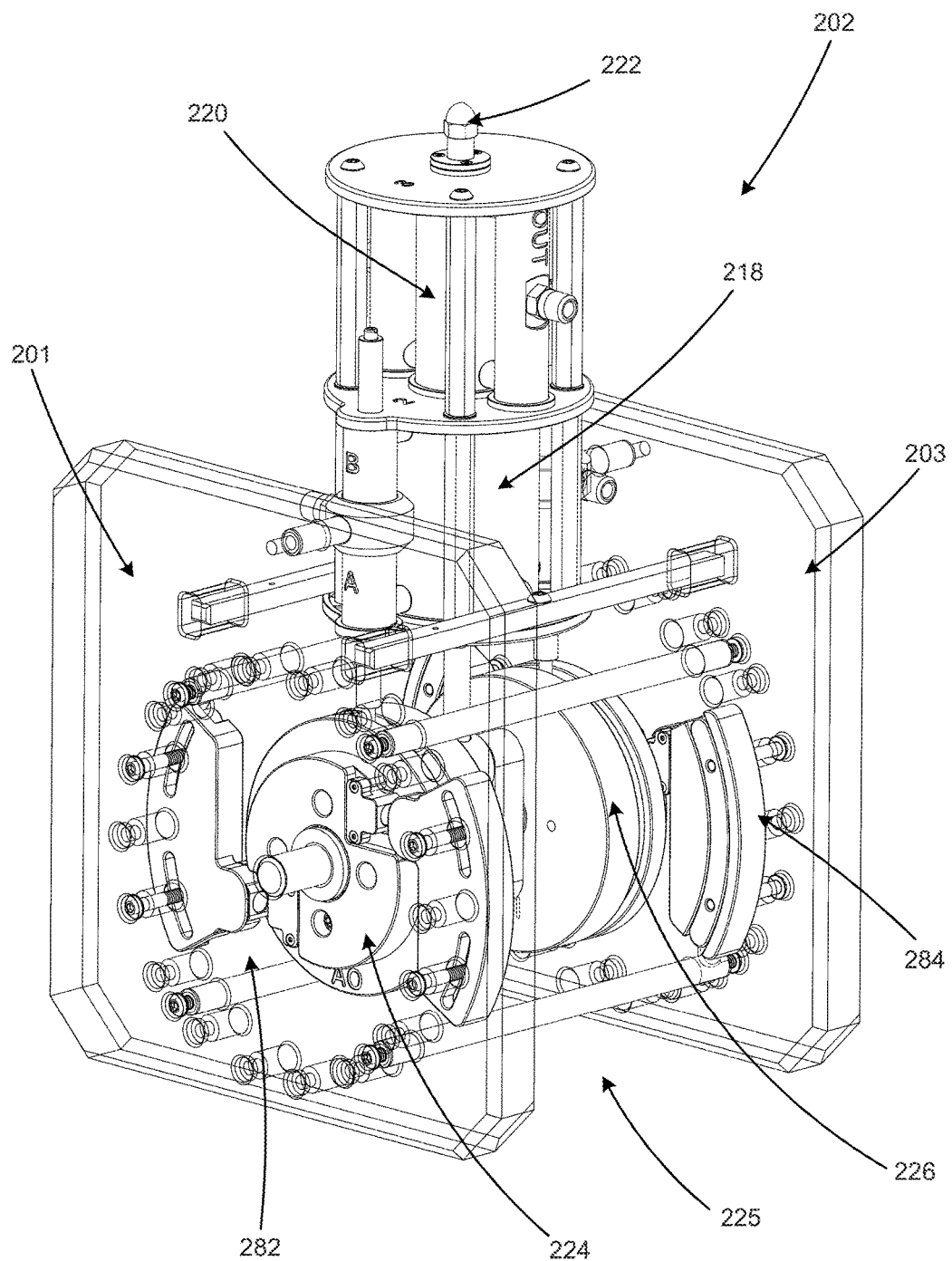
FIG. 6 is a perspective view of the dispensing device of the beverage dispensing system of FIG. 3.

The dispensing device 202 can be encased within a housing 203 as shown in FIG. 3. As with the previous embodiment, the dispensing device 202 provides a metering/control pump, that includes two piston/cylinder assemblies that are joined together, and operate in synchronized coordination with each other. As shown in FIG. 6, the dispensing device 202 includes a first cylinder 218, a second cylinder 220, and a piston rod 222. The piston rod is operatively coupled to the first cylinder 218 and the second cylinder 220. The piston rod 222 is also operatively coupled to a flywheel assembly 225 that includes a first flywheel 224 and a second flywheel 226. The dispensing device 202 also includes a first magnet assembly 282 and a second magnet assembly 284. The dispensing device 202 also includes a first support 201 (shown in transparent for illustration purposes) and a second support 203.

Figure 7:
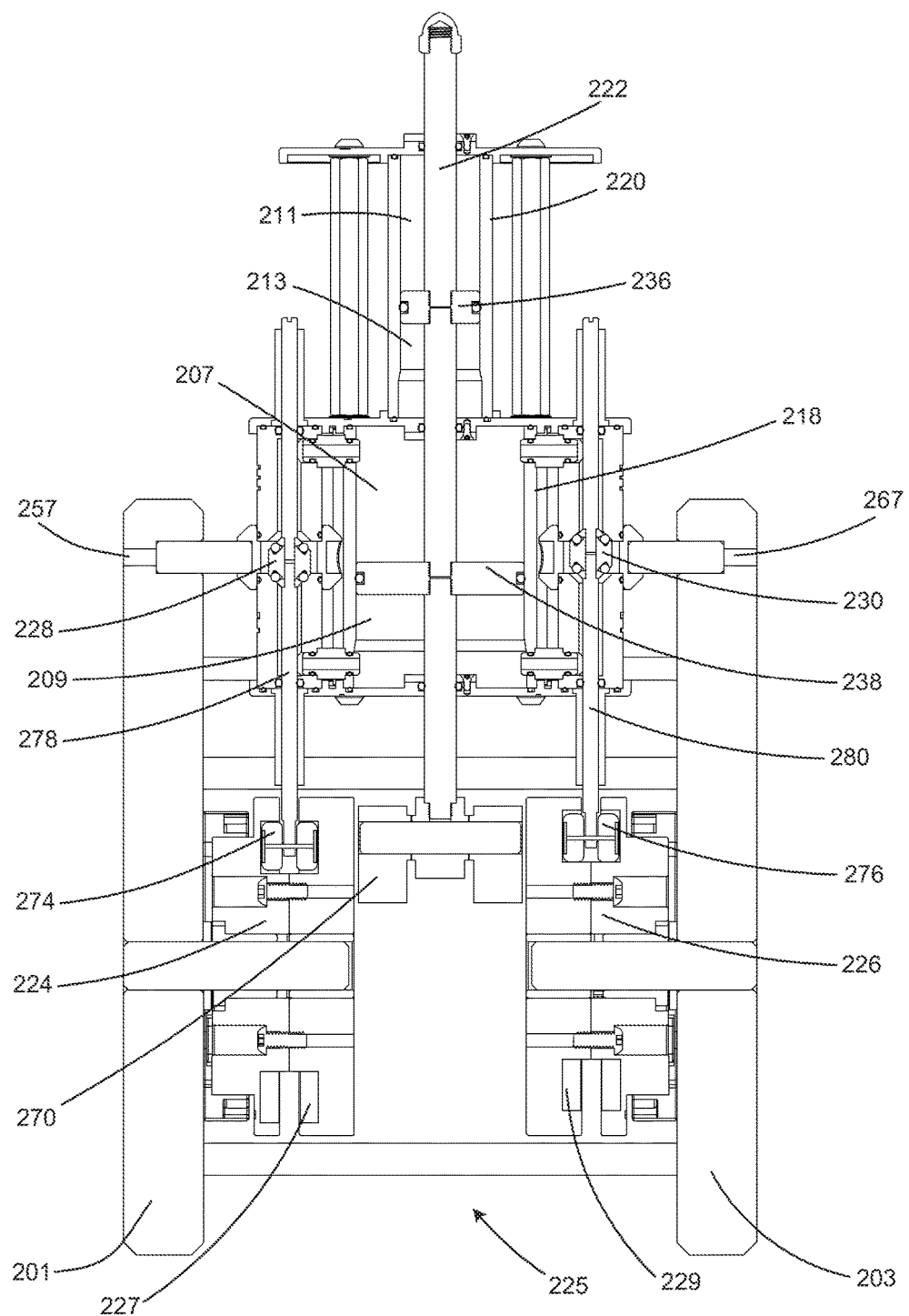
FIG. 7 is a cross-sectional side view of the dispensing device of FIG. 6 shown in a first position.

As shown in FIG. 7, the first cylinder 218 and the second cylinder 220 can be operatively coupled together by the piston rod 222. The piston rod 222 can include a single piston rod that is coupled to a first piston 238 movably disposed in the first cylinder 118 and a second piston 236 movably disposed in the second cylinder 220. For example, the first and second cylinders 218, 220 can be joined vertically by sharing the same "through" piston rod. Alternatively, the cylinders 218, 220 can be operatively connected in an alternate orientation to each other by other mechanical means. For example, the cylinders 218, 220 can be disposed side-by-side. In some embodiments, an intermediate piston rod (not shown) can be operatively coupled between the pistons of the respective first and second cylinders 218, 220.

The first cylinder 218 can operate to meter the flow of pressurized carbonated water through the system 200. The second cylinder 220 can meter the flow of beverage (e.g., beer) concentrate through the system 200. The ratio of the displacement volumes of these two cylinders 218, 220 can be such that each "stroke" (up or down) of the two pistons 238, 236 can deliver an exactly uniform ratio of the two liquids (e.g., carbonated water and beverage concentrate (e.g., beer concentrate)). These ratios are designed to regulate the dispensed volumes of the two liquids (beer concentrate and carbonated water) based upon the particular concentrate's level of concentration. For example, a 1:6 concentrate of beer (one part beer makes 6 parts finished beverage) would require 5× the volume of carbonated water for every 1× of volume of beer concentrate.

The piston rod 222 extends externally from the two cylinders 218, 220 and is coupled to the dual flywheel assembly 225 via a hinged arm 270. The flywheel assembly 225 provides a clocking mechanism that is oriented in a rotationally specific position based upon where the piston rod 222 is within the first cylinder 220 relative to its up/down cycle. The first flywheel 224 is connected to an inlet valve 228 via a valve stem 278 and the second flywheel 226 is coupled to an outlet valve 230 via a valve stem 280. The valve stem 278 is connected to a valve wheel 274 and the valve stem 280 is connected to a valve wheel 276. The valve wheels 274, 276 can move within grooves or "tracks" 227, 229 within the corresponding flywheel 224, 226. These grooves 227, 229 govern the vertical position of the valve stems 278, 280 such that the two valves 228, 230 can be controlled vertically to regulate the path of fluid entering and exiting the carbonated water cylinder, i.e., first cylinder 218. The positioning of the valves 228, 230 can be precisely controlled by the orientation of the respective flywheel 224, 226, which is precisely controlled by the piston rod 222, and hence the position of the piston 238 within its "stroke" or cycle. The valves 228, 230 are timed such that when carbonated water is entering the top of the first cylinder 218 (above the piston 238), it is being exhausted from the bottom of the first cylinder 218 (below the piston 238), and vice versa.

The piston 236 within the second cylinder 220 moves in tandem with the piston 238 within the first cylinder 218 as carbonated water flows through the first cylinder 218, exerting a force on the piston 238. Thus, as the piston 238 within the first cylinder 218 moves through its stroke, so too does the piston 236 within the second cylinder 220. The regulated difference of displacement volumes between the pistons within the cylinders 218 and 220 can be controlled, for example, by the diameter of the respective cylinders 218, 220.

The beverage concentrate (e.g., beer concentrate) is not under pressure, and is drawn into the second cylinder 220 via vacuum generated by the movement of the piston 236 within the second cylinder 220. Similar to the second cylinder 120 of system 100 described above, the second cylinder 220 can have inlet ports (not shown) coupled to the second cylinder 220 above and below the piston 236 and can include one way valves (e.g., duck bill, umbrella, spring-check valve, etc.) that allow fluid flow into the second cylinder 220, but not out. Outlet ports (not shown) are coupled to the second cylinder 220 above and below the piston 236 and can include one way valves that only allow fluid flow out of the second cylinder 220. Thus, as the piston 236 travels up and down within the second cylinder 220 under the power of the piston 238 within the first cylinder 218, a metered volume of concentrate is drawn into and pumped out of the second cylinder 220. Although not specifically shown, the pistons, valves, and connections throughout the dispensing device 202 can be sealed with appropriate O-rings and sealing materials to maintain a pressure and liquid tight seal where required.

The system 200 can optionally include diversion or purge valves (not shown) that can be used to purge the concentrate from the second cylinder 220. For example, if a user wants to clean the second cylinder 220 or flush the second cylinder 220 such that a different concentrate can be used, the purge valves can be actuated. Specifically, a control valve (not shown) can be coupled to the concentrate intake line 244 between the source of concentrate 204 and the second cylinder 220. The control valve can be actuated to divert the flow of fluid to travel through either a top or the bottom inlet port of the second cylinder 220. The control valve can include any suitable device for controlling the flow of fluid between, for example, two inlets and two outlets, such as, for example a three or four-way valve. A purge valve (not shown) can be coupled to the carbonated water intake line 258 and can be, for example, mounted to the drawer 210, disposed outside the drawer 210, or disposed inside the drawer 210. A purge line (not shown) can be connected between the purge valve and the control valve.

During normal operation of the system 200, the control valve is in a first configuration that allows the flow of concentrate between the source of concentrate 204 and the two inlet ports of the second cylinder 220, and the purge valve is in a first position that allows the flow of carbonated water only to the first cylinder 218. During a flushing operation of the system 200, the control valve is moved to a second configuration to block the flow of concentrate from the source of concentrate 204 from flowing to the second cylinder 220 and allow carbonated water to flow from the purge line, through the control valve and into the concentrate intake line 244. The purge valve can be actuated to allow carbonated water to flow through the purge line and through the concentrate flow path (e.g., to the control valve and intake line 244). In this manner, a concentrate can be disconnected from the system, and the entire concentrate flow path can be purged with carbonated water. By alternatingly diverting this carbonated water through the top and bottom input ports of the second cylinder 220 (e.g., the concentrate cylinder), while opening the tap 208, the user can watch the blended beverage exit the tap 208 until it is clear carbonated water, indicating that all of the concentrate (e.g., beer concentrate) within the system has been "flushed". Then the control valve can be moved to its first configuration, the purge valve can be moved to its first position, and a new style of concentrate (e.g., beer concentrate) can be added to the system if desired.

A serving counter (not shown) can be installed on moving parts of the dispensing device 202, such that the total number of servings dispensed from the tap 208 can be counted. The total number of servings can be displayed, for example, on the front of the drawer 210. The serving counter can be mechanical or electrical. Like the odometer on a car, the serving counter can be manually reset to zero. By counting how many servings of a beverage are dispensed through the tap 208, regularly scheduled maintenance can be performed on the dispensing device 202 at designated intervals.

The cylinders 218, 220 of the dispensing system 200 can be any size so long as the cylinders 218, 220 are scaled properly to output the desired concentrate-to-carbonated water ratio. For example, the cylinders 218, 220 can be sized such that one full down stroke of the piston rod 222 results in the tap 208 dispensing one serving of a beverage (e.g., a 16-ounce beer), and one full up stroke of the piston rod 222 results in the tap 208 dispensing a second serving of a beverage. Alternatively, the cylinders 218, 220 can be scaled to be smaller, so that one full down stroke of the piston rod 222 results in a half serving or a quarter serving being dispensed from the tap 208. In an embodiment where one full down stroke results in the tap 208 dispensing a quarter serving of a beverage, the piston rod 222 would need to move through a full cycle (i.e., a full down and up stroke) twice for the dispensing device 202 to dispense one serving.

In order to facilitate the blending of additional liquid streams, additional piston/cylinder assemblies can be included in the dispensing system 200 in a similar way to the concentrate cylinder 220. By either extending the piston rod 222 to support another "inline" cylinder, by driving additional cylinders off of a shared flywheel, or by other mechanical attachment to any of the moving parts of the dispensing system 200, additional cylinders can be added to the system 200. The additional cylinder(s) can be used to add alcohol, hop extracts, fruit flavors, and/or other flavors that enhance or modify the flavor profile of a beer or soda. The fluid in the additional cylinder(s) can be added to the dispensing system 200 by being pumped through the additional cylinder(s) in the same way the concentrate is pumped through the concentrate cylinder 220 (via an array of check valves that govern the forward flow of the liquid).

Figure 19:
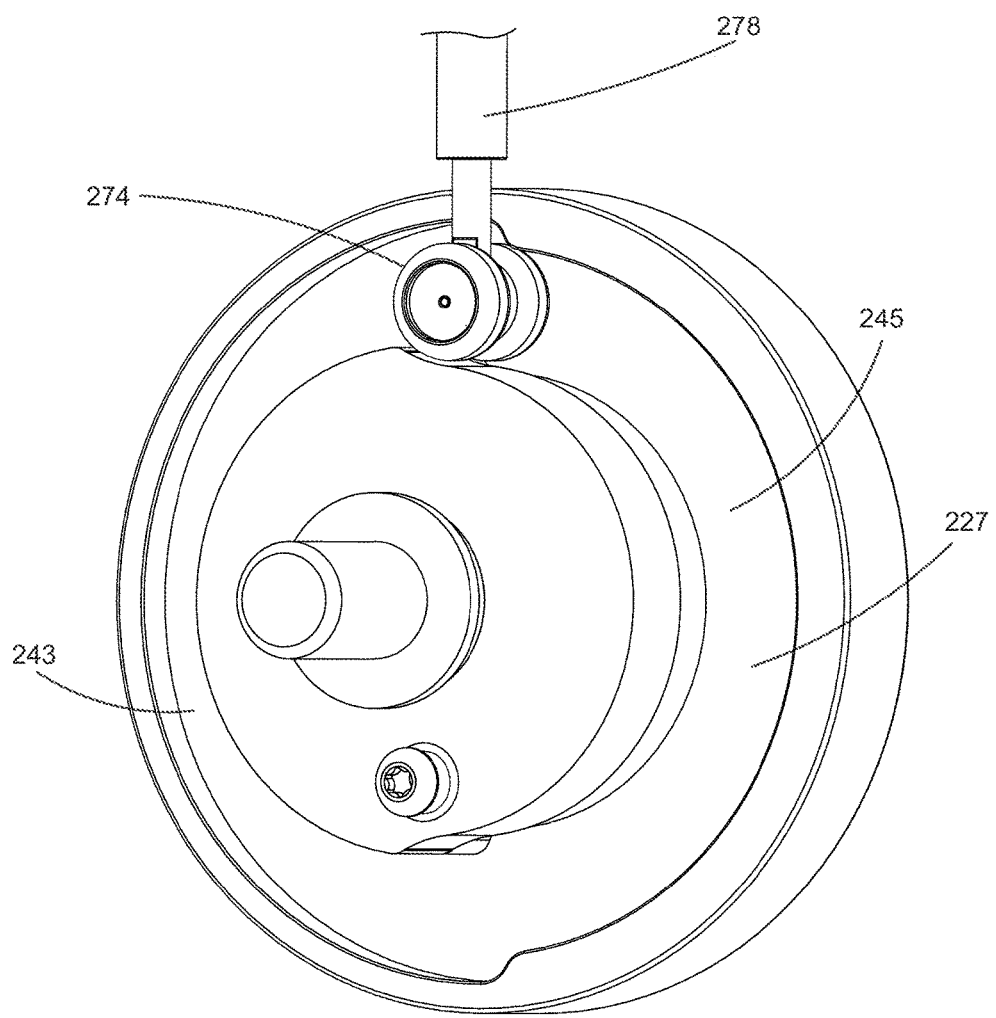
FIG. 19 is perspective view of a portion of the dispensing device of FIG. 6.
Figure 20:
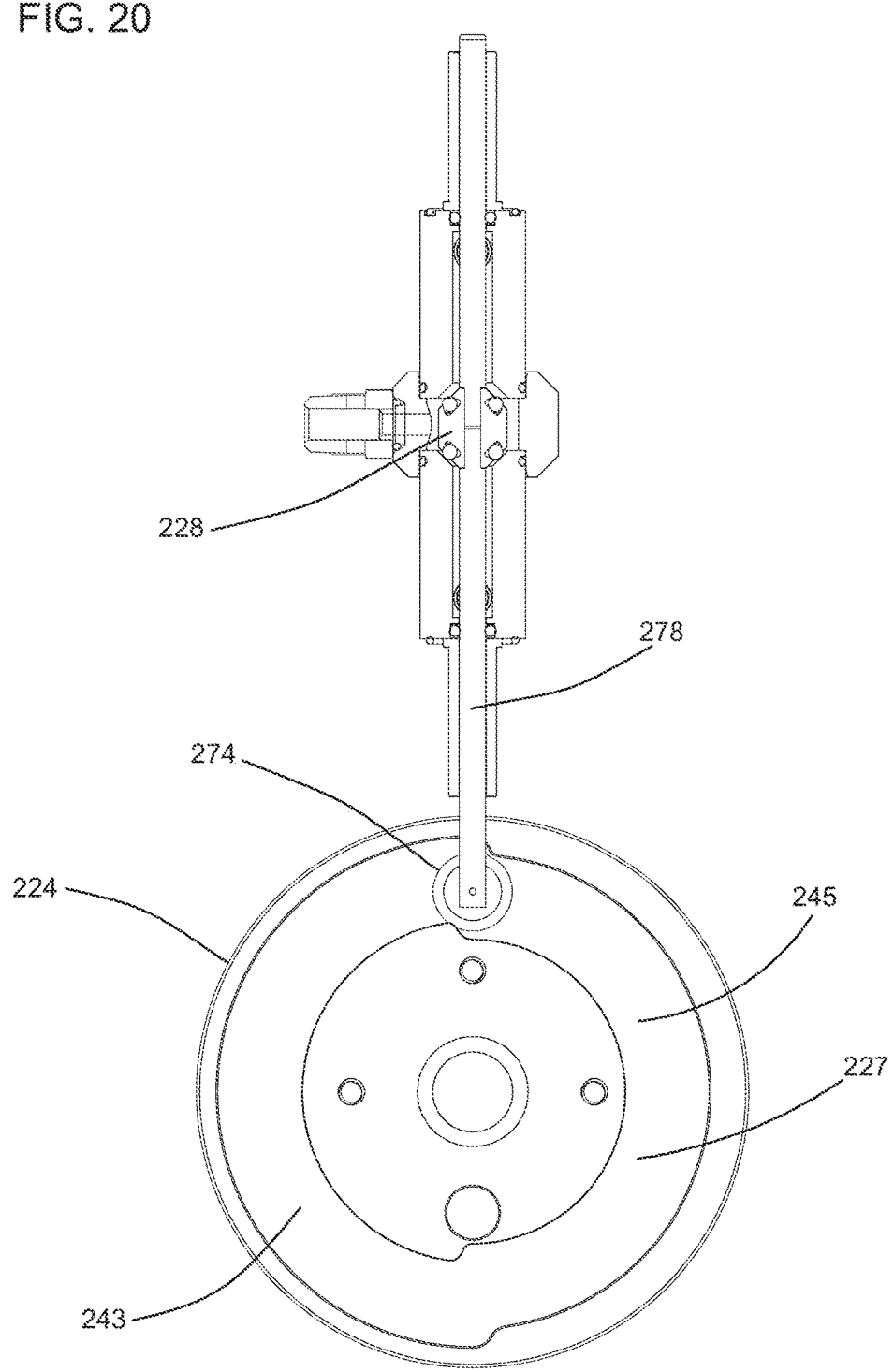
FIG. 20 is side view of a portion of the dispensing device of FIG. 6.

FIGS. 19 and 20 show a portion of the flywheel 224 with one half removed to show the groove 227. The groove 227 includes a first portion 243 and a second portion 245. As shown in FIGS. 19 and 20, the first portion 243 has a raised surface relative to the surface of the second portion 245. As the flywheel 224 is rotated as a result of the piston rod 222 moving the hinged arm 270, the valve wheel 274 can move between being disposed on the first portion 243 and being disposed on the second portion 245 of the groove 227,
moving the inlet valve 228 between an up position (when on the first portion 243) and a down position (when on the second portion 245). When the valve wheel 274 is disposed in the first portion 243 of the groove 227, the valve stem 278 is moved to an up position, pushing the inlet valve 228 into an up position. When the inlet valve 228 is in the up position, carbonated water can flow through the inlet valve 228 and into the first cylinder 218 below the piston 238. When the valve wheel 274 is in the second portion 245 of the groove 227, the valve stem 278 is in a down position, pulling the inlet valve 228 into the down position. With the inlet valve 228 is the down position, carbonated water can flow through the inlet valve 228 and into the first cylinder above the piston 238. The flywheel 226 is similar in function and configuration to the flywheel 224, except that the flywheel 224 and the flywheel 226 are arranged so that the grooves 227 and 229 have opposite configurations. For example, the flywheel 226 can include a similar first portion and second portion as described for flywheel 224. During operation, when the valve wheel 274 is within the first portion 243 of the groove 227, the valve wheel 276 is within the second portion (not shown in FIGS. 19 and 20) of the groove 229. This results in the inlet valve 228 being in the up position and the outlet valve 230 being in the down position. Conversely, when the valve wheel 274 is within the second portion 245 of the groove 227, the valve wheel 276 is within the first portion (not shown in FIGS. 19 and 20) of the groove 229. This results in the inlet valve 228 being in the down position and the outlet valve 230 being in the up position.

During operation of the dispensing device 202, as the flywheels 224, 226 rotate, the valve wheels 274, 276 transition between the first and second portions of their respective grooves 227, 229. When the piston rod 222 is at the top and bottom of its stroke, there can be a brief moment where the valves 228, 230 are in the same position (e.g., both are in the up position or both are in the down position). As a result, the carbonated water will flow into and out of the cylinder 218 on the same side of the piston, which can potentially cause a "stall out". For example, when the piston rod 222 is at the bottom position of the cycle, both of the valves 228, 230 can be in the down position, allowing carbonated water to flow into the first cylinder 218 above the piston 238 and to flow out of the first cylinder 218 above the piston 238. In this position, no carbonated water is able to enter the first cylinder 218 below the piston 238 in order to push the piston 238 upward and continue the operation of the dispensing device 202. To address this, a magnet or series of magnets can be integrated into the flywheel assembly 225, such that as the piston rod 222 reaches one of its "stall out" positions (full up position, or full down position), the magnet(s) attached to the flywheels 224, 226 and/or attached to other support structure help to pull the flywheels 224, 226 through their "stuck" or "stall out" positions.

Figure 21:
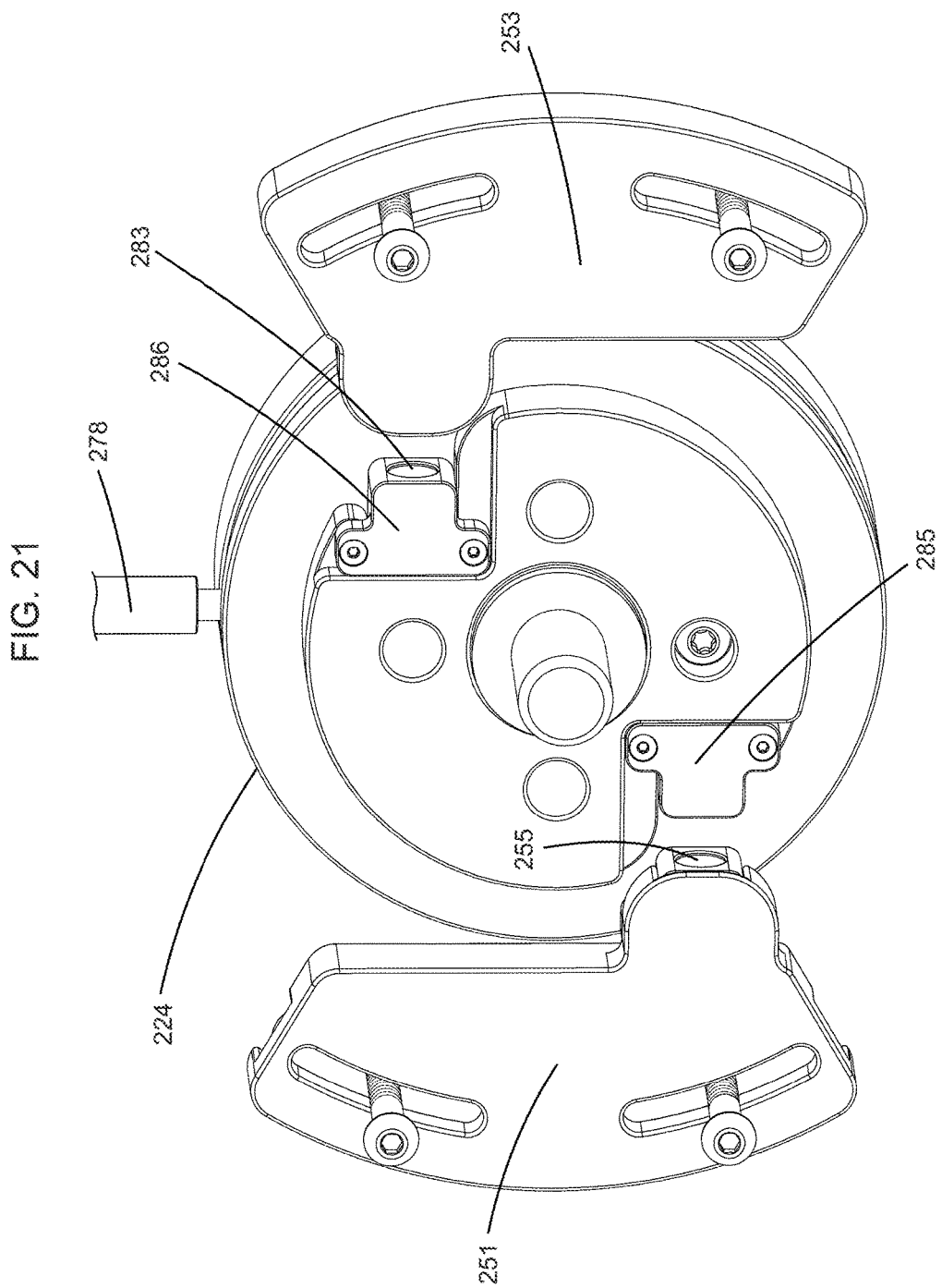
FIG. 21 is a perspective view of a portion of the dispensing device of FIG. 6.

FIG. 21 shows a portion of the first magnet assembly 282 of the dispensing device 202. Two flywheel magnet supports 285, 286 are mounted to the flywheel 224. The first flywheel magnet support 285 contains a first flywheel magnet (not shown). The second flywheel magnet support 286 contains a second flywheel magnet 283. Two housing magnet supports 251, 253 are mounted to first support 201. The first housing magnet support 251 contains a first housing magnet 255 and the second housing magnet support 253 contains a second housing magnet (not shown). The first flywheel magnet and the first housing magnet 255 can include partnered attractive surfaces so that the first housing magnet 255 can draw the first flywheel magnet toward the first housing magnet 255. Similarly, the second flywheel magnet 283 and the second housing magnet can include partnered attractive surfaces so that the second housing magnet can draw the second flywheel magnet 283 toward the second housing magnet. In this manner, the assembly can start/stop in a controlled fashion, without need for the flywheel 224 to carry momentum. As an alternative to positioning the magnet(s) in an orientation that utilizes attractive forces, magnet(s) can be integrated such that a repulsive force is harnessed for the purpose of helping the flywheels 224, 226 move through the "stuck" positions. Although the magnet assembly is described as using magnets, the magnet assembly can include any form of ferromagnetic material. The second magnet assembly 284, if included, can be similar in configuration and functionality to the first magnet assembly.

Figure 8:
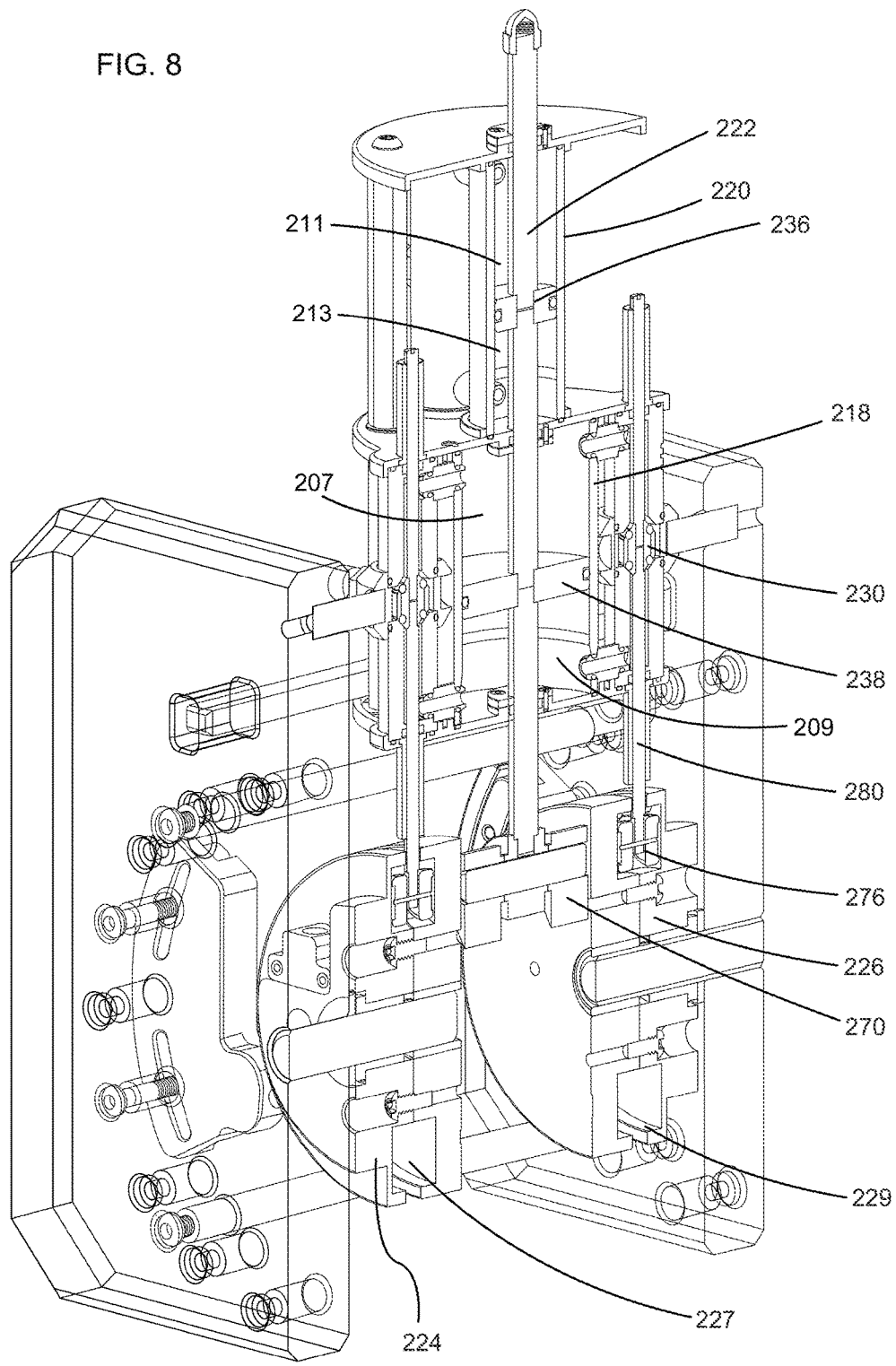
FIG. 8 is a cross-sectional perspective view of the dispensing device of FIG. 6 shown in the first position.
Figure 9:
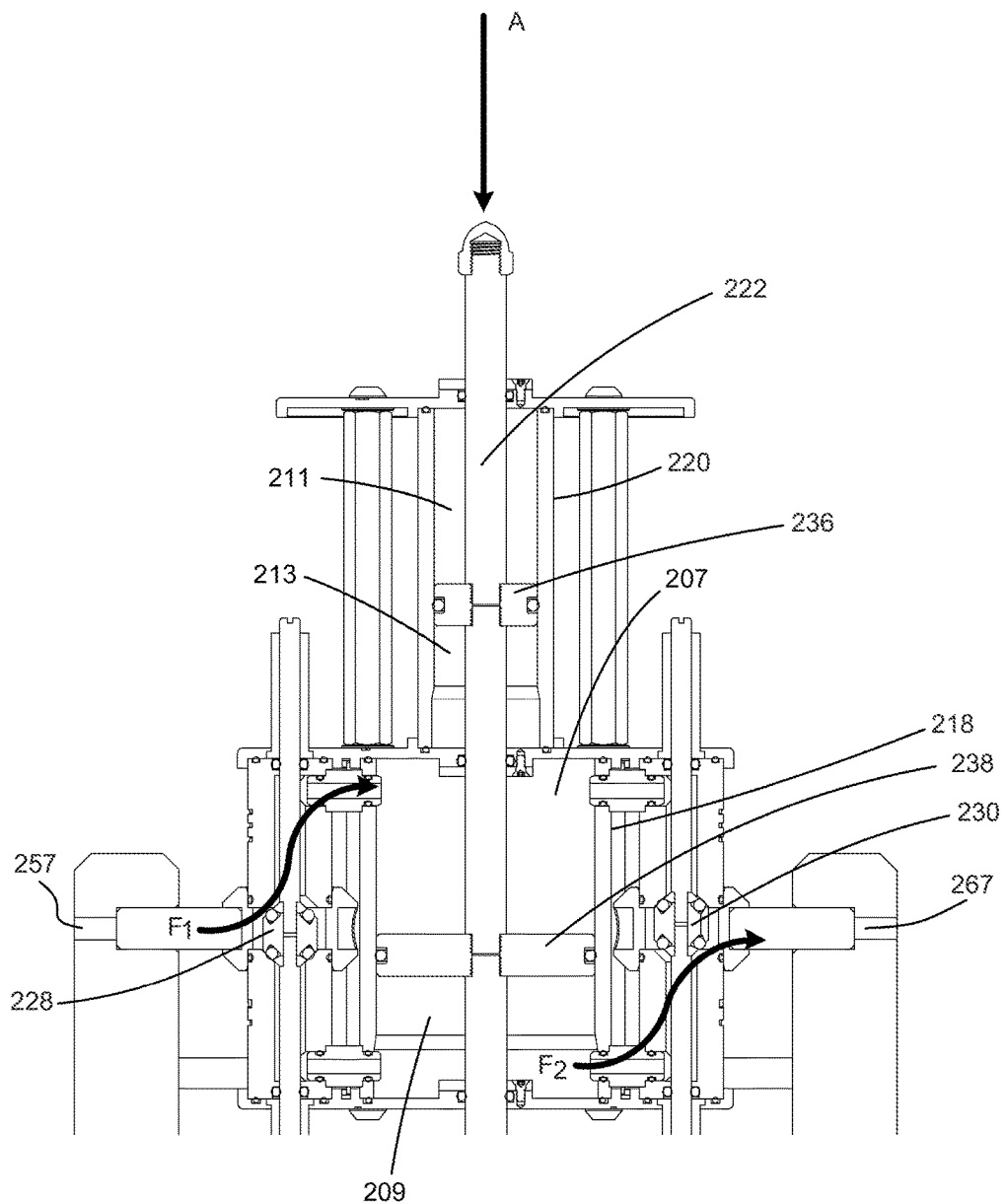
FIG. 9 is an enlarged cross-sectional side view of a portion of the dispensing device of FIG. 6 shown in the first position.

FIGS. 7-18 illustrate the dispensing device 202 in various configurations throughout its operational cycle. FIGS. 7-9 show the dispensing device 202 in a configuration where the piston rod 222, via the hinged arm 270, has rotated the first flywheel 224 into an orientation where the valve wheel 274 is in the second portion 245 of the groove 227, causing the inlet valve 228 to be in a down position, and simultaneously has rotated the second flywheel 226 into an orientation such that the valve wheel 276 is in the first portion (not shown in FIGS. 19 and 20) of the groove 229, causing the outlet valve 230 to be in an up position. As a result, carbonated water follows a flow path $F_1$ as it moves from an inlet port 257 into the first interior region 207 of the first cylinder 218 above the piston 238. The carbonated water drives the piston 238 downward, pushing carbonated water previously drawn into the second interior region 209 of the first cylinder 218 below the piston 238 along flow path $F_2$ and out of outlet port 267. The downward movement of the piston 238 drives the piston rod 222 in a downward direction, as shown by arrow A in FIG. 9, causing the piston 236 to move downward simultaneously. As a result, concentrate is drawn into the first interior region 211 of the concentrate cylinder 220 above the piston 236. At the same time, concentrate that was previously drawn into the second interior region 213 of the concentrate cylinder 220 below the piston 236 is driven out of the concentrate cylinder 220 by the downward movement of the piston 236.

Similar to dispensing system 100 shown in FIG. 2, the carbonated water exits the first cylinder 218 via an outlet line (not shown) and the concentrate exits the second cylinder 220 via an outlet line (not shown). The outlet line of the first cylinder and the outlet line of the second cylinder are both coupled to a mixing member (not shown). The mixing member can be any suitable apparatus for combining the carbonated water and concentrate flowing from the respective cylinders 218, 220. For example, the mixing member can be a T-connector or a Y-connector. The mixing member 232 can include an internal component that promotes fluid mixing, such as is found in mixing nozzles. After flowing through the mixing member 232, and when the tap 208 is in the open position, the combined concentrate and carbonated water can flow through exhaust line 269 to the tap 208 and out of the system 200.

Figure 10:
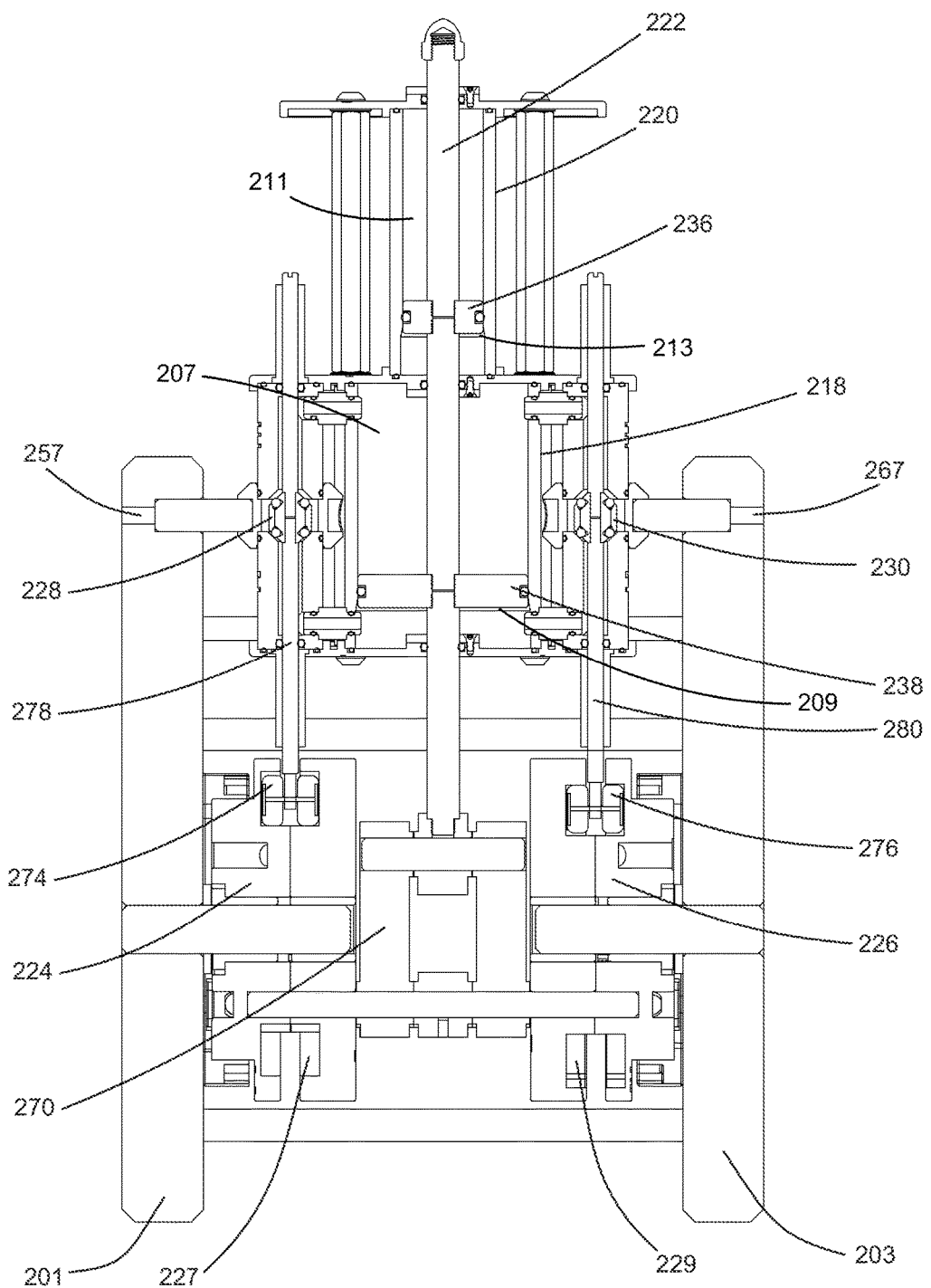
FIG. 10 is a cross-sectional side view of the dispensing device of FIG. 6 shown in a second position.
Figure 11:
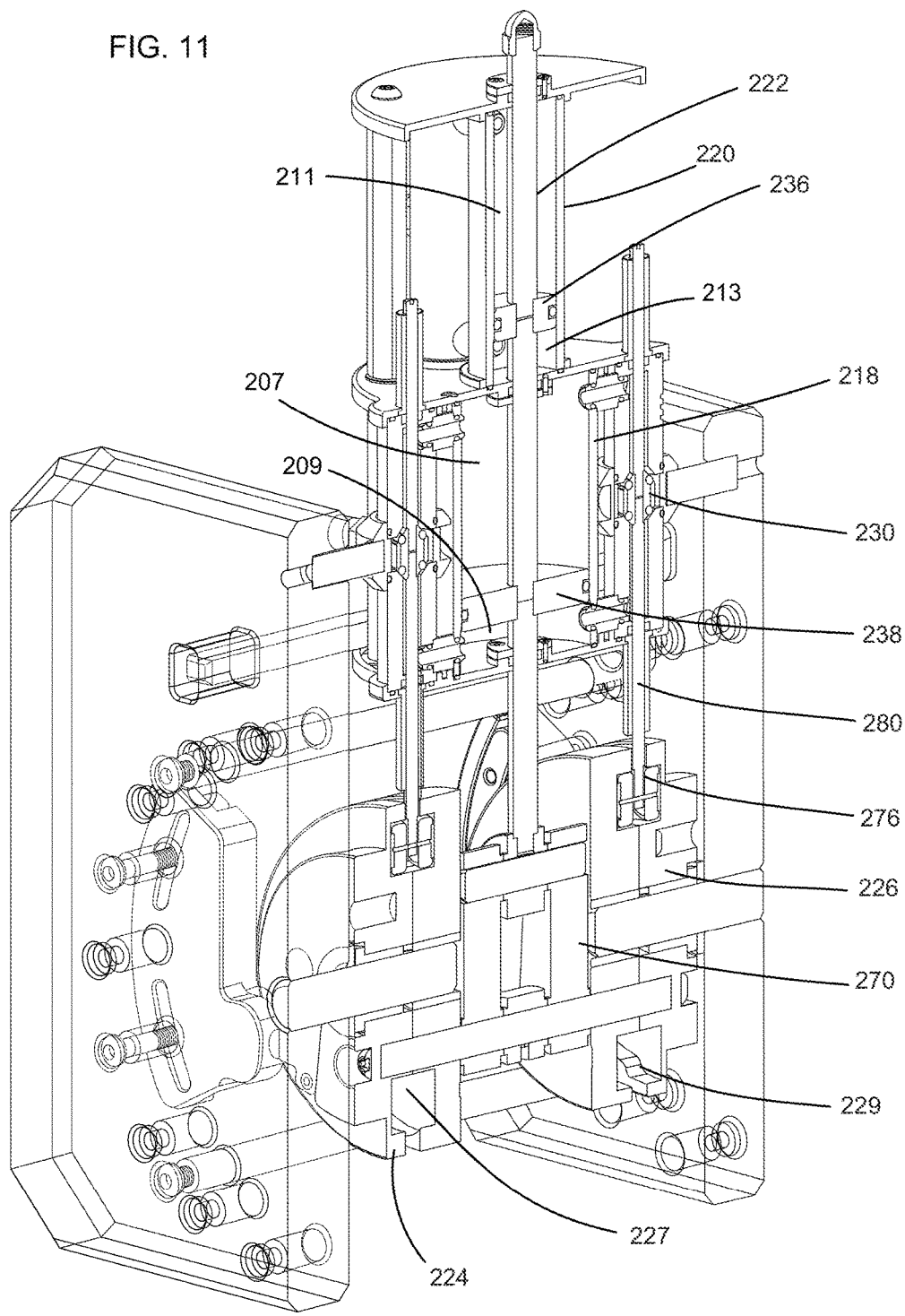
FIG. 11 is a cross-sectional perspective view of the dispensing device of FIG. 6 shown in the second position.
Figure 12:
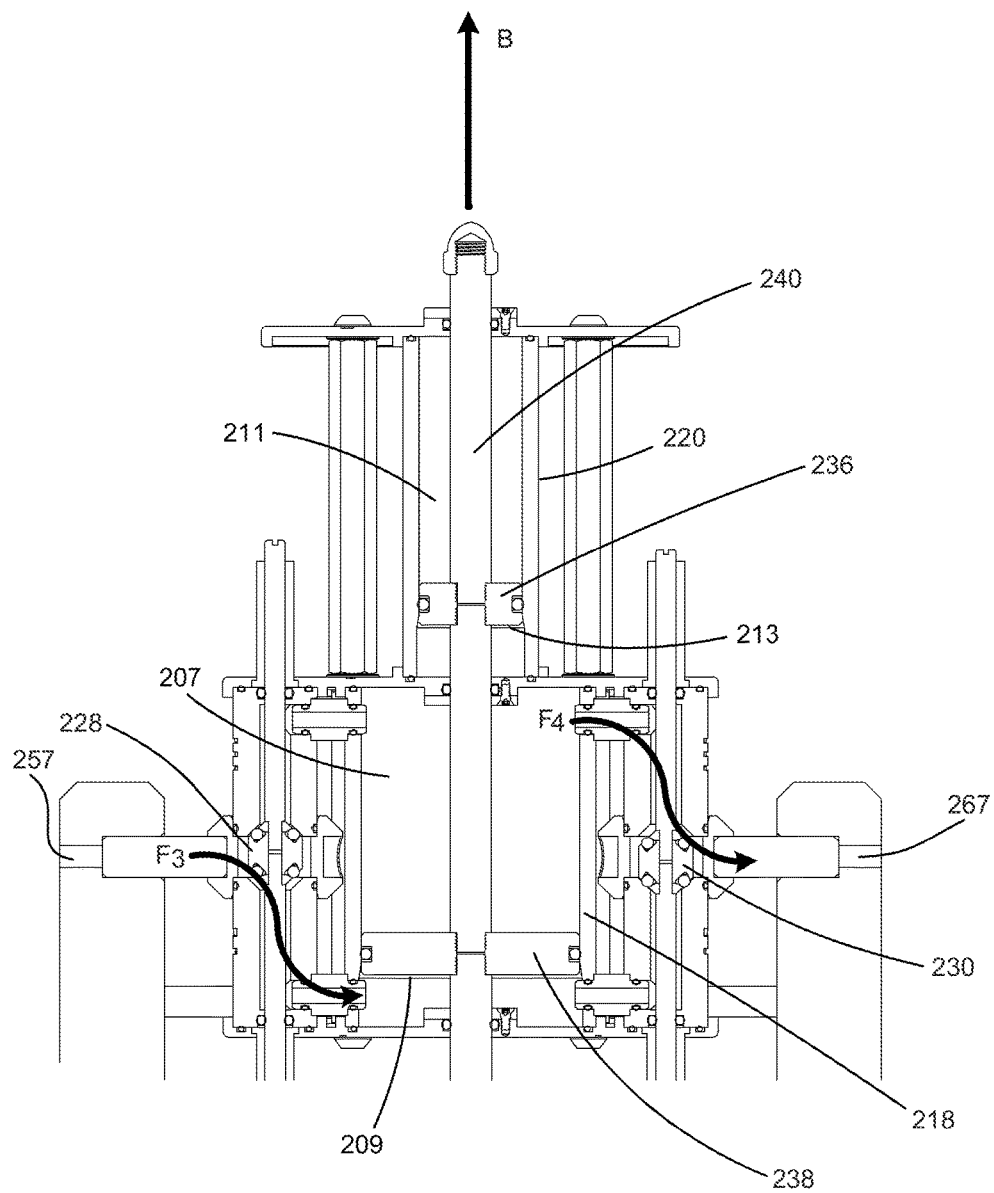
FIG. 12 is an enlarged cross-sectional side view of a portion of the dispensing device of FIG. 6 shown in the second position.

FIGS. 10-12 show the dispensing device 202 at the point where the piston rod 222, via the hinged arm 270, has rotated the first flywheel 224 into an orientation where the valve wheel 274 has moved into the first portion 243 of the groove 227, causing the inlet valve 228 to move from the down position to the up position, and simultaneously has rotated the second flywheel 226 into an orientation where the valve wheel 276 has moved into the second portion (not shown in FIGS. 19 and 20) of the groove 229, causing the outlet valve 230 to move from the up position to the down position. As a result, carbonated water follows a flow path $F_3$ as it moves from the inlet port 257 into the second interior region 209 of the first cylinder 218 below the piston 238. The carbonated water entering the second interior region 209 of the first cylinder 218 below the piston 238 drives the piston 238 upward, pushing carbonated water previously drawn into the first interior region 207 of the first cylinder 218 above the piston 238 during the stroke of FIGS. 7-9 along flow path $F_4$ and out of the cylinder 218. The upward movement of the piston 238 drives the piston rod 222 in an upward direction, as shown by arrow B in FIG. 12, causing the piston 236 to move upward simultaneously. As a result, concentrate is drawn into the second interior region 2013 of the concentrate cylinder 220 below the piston 236 and concentrate that was drawn into the first interior region 211 of the concentrate cylinder 220 above the piston 236 during the stroke of FIGS. 7-9 is driven out of the concentrate cylinder 220.

Figure 13:
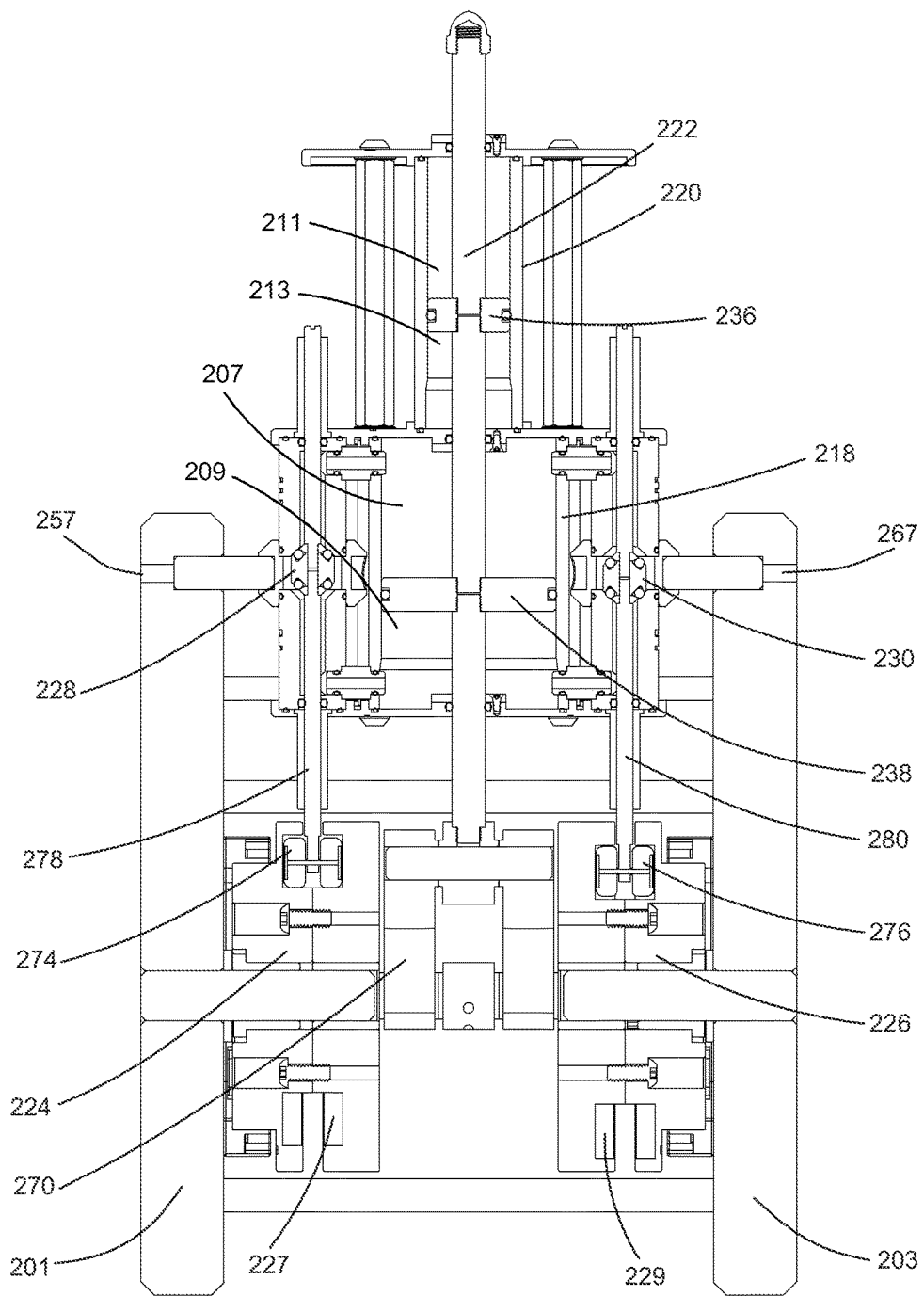
FIG. 13 is a cross-sectional side view of the dispensing device of FIG. 6 shown in a third position.
Figure 14:
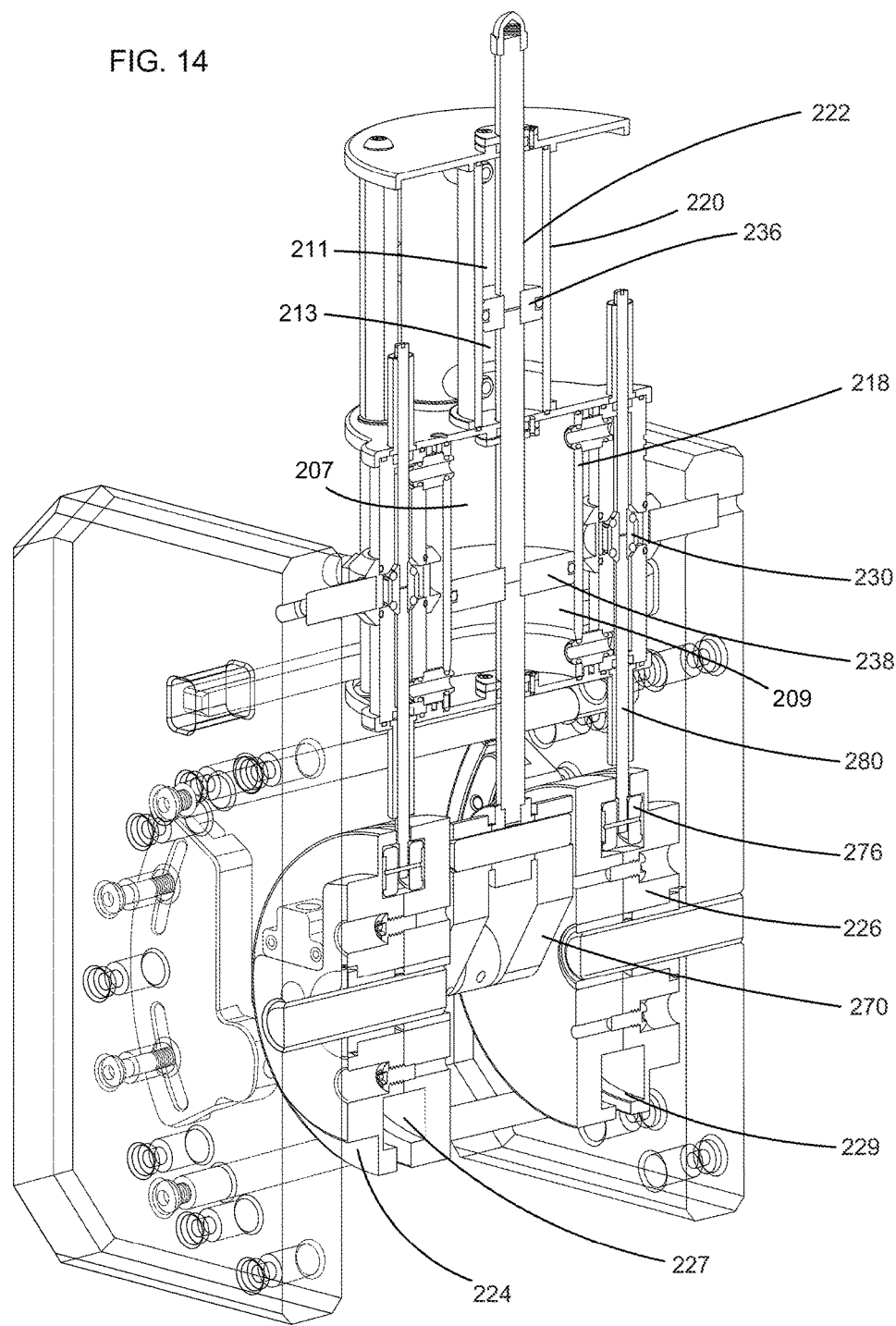
FIG. 14 is a cross-sectional perspective view of the dispensing device of FIG. 6 shown in the third position.
Figure 15:
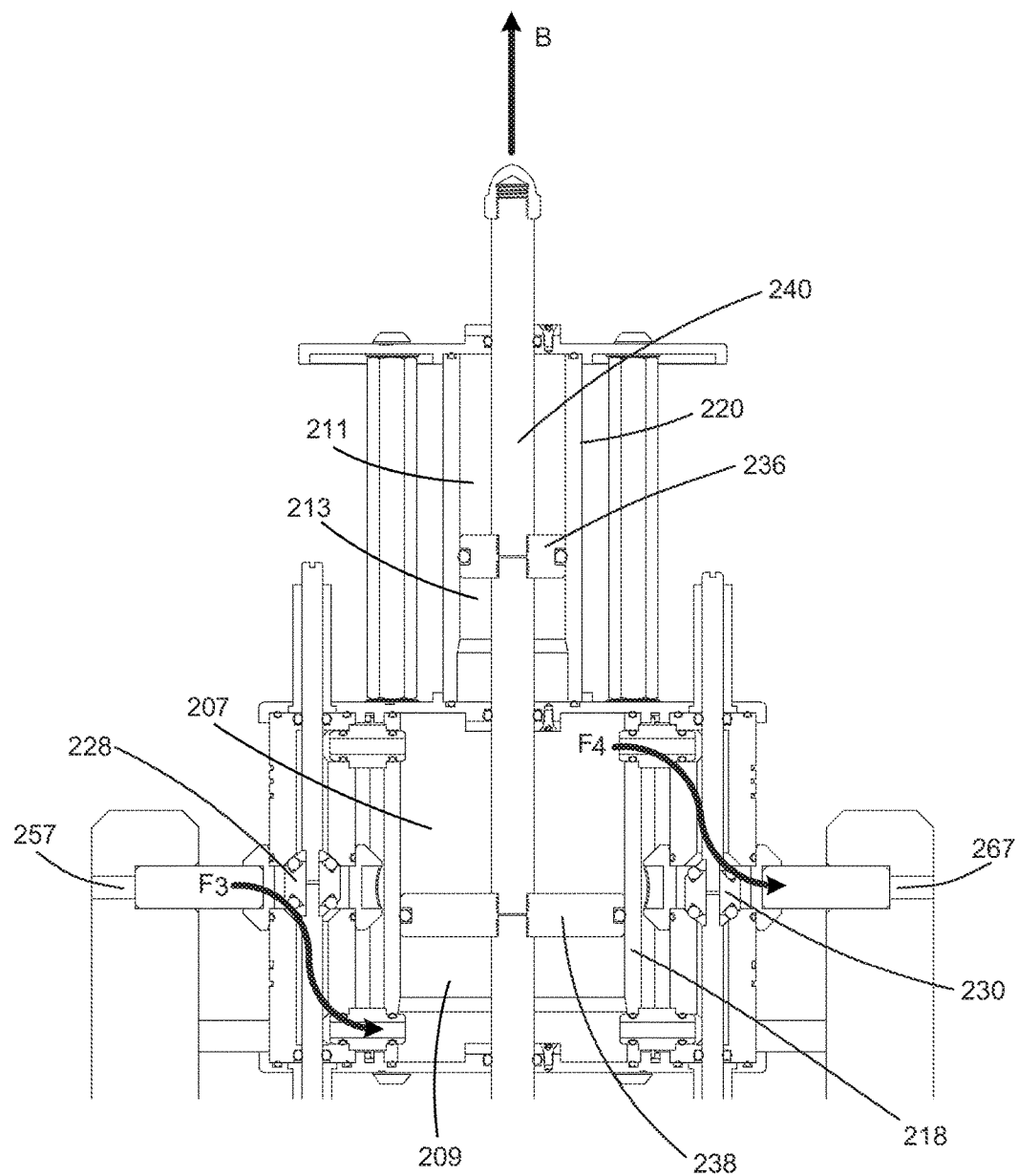
FIG. 15 is an enlarged cross-sectional side view of a portion of the dispensing device of FIG. 6 shown in the third position.

FIGS. 13-15 show the dispensing device 202 in a configuration where the piston rod 222 is partially through the upward stroke, as shown by arrow B in FIG. 15. In this configuration, the flywheel 224 has rotated such that the valve wheel 274 continues to be within the first portion 243 of the groove 227 and the valve wheel 276 continues to be within the second portion of the groove 229, causing the inlet valve 228 to remain in the up position and the outlet valve 230 to remain in the down position. As the piston rod 222 moves upward, the piston 238 continues to push carbonated water out of the first cylinder 218 along flow path $F_4$ and receive carbonated water into the first cylinder 218 below the piston 238 along flow path $F_3$. The upward movement of the piston 238 continues to drive the piston rod 222 in an upward direction, causing the piston 236 to continue moving upward simultaneously. As a result, concentrate continues to be drawn into the second interior region 213 of the concentrate cylinder 220 below the piston 236 and concentrate that was drawn into the first interior region 211 of the concentrate cylinder 220 above the piston 236 during the stroke of FIGS. 7-9 continues to be driven out of the concentrate cylinder 220.

Figure 16:
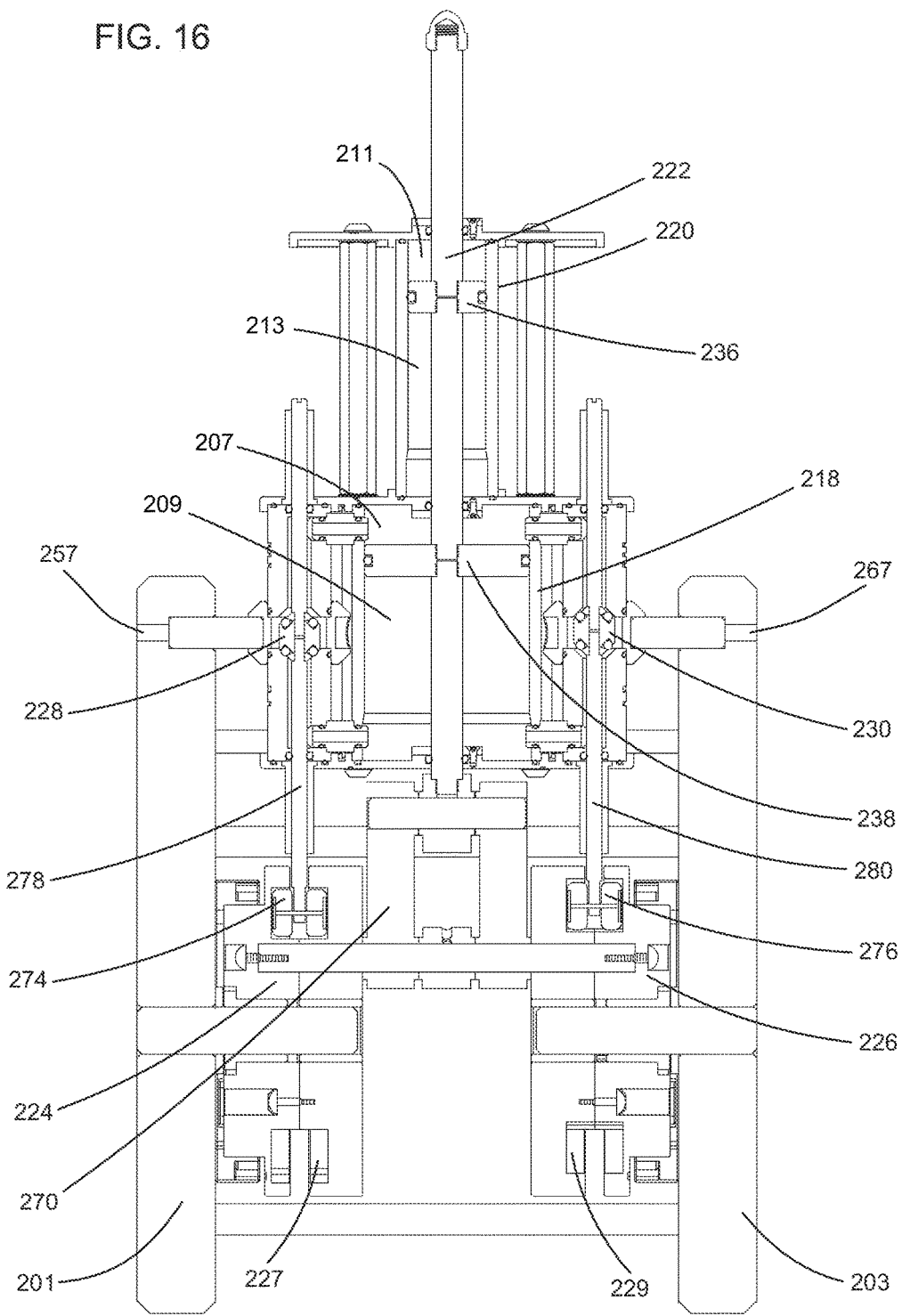
FIG. 16 is a cross-sectional side view of the dispensing device of FIG. 6 shown in a fourth position.
Figure 17:
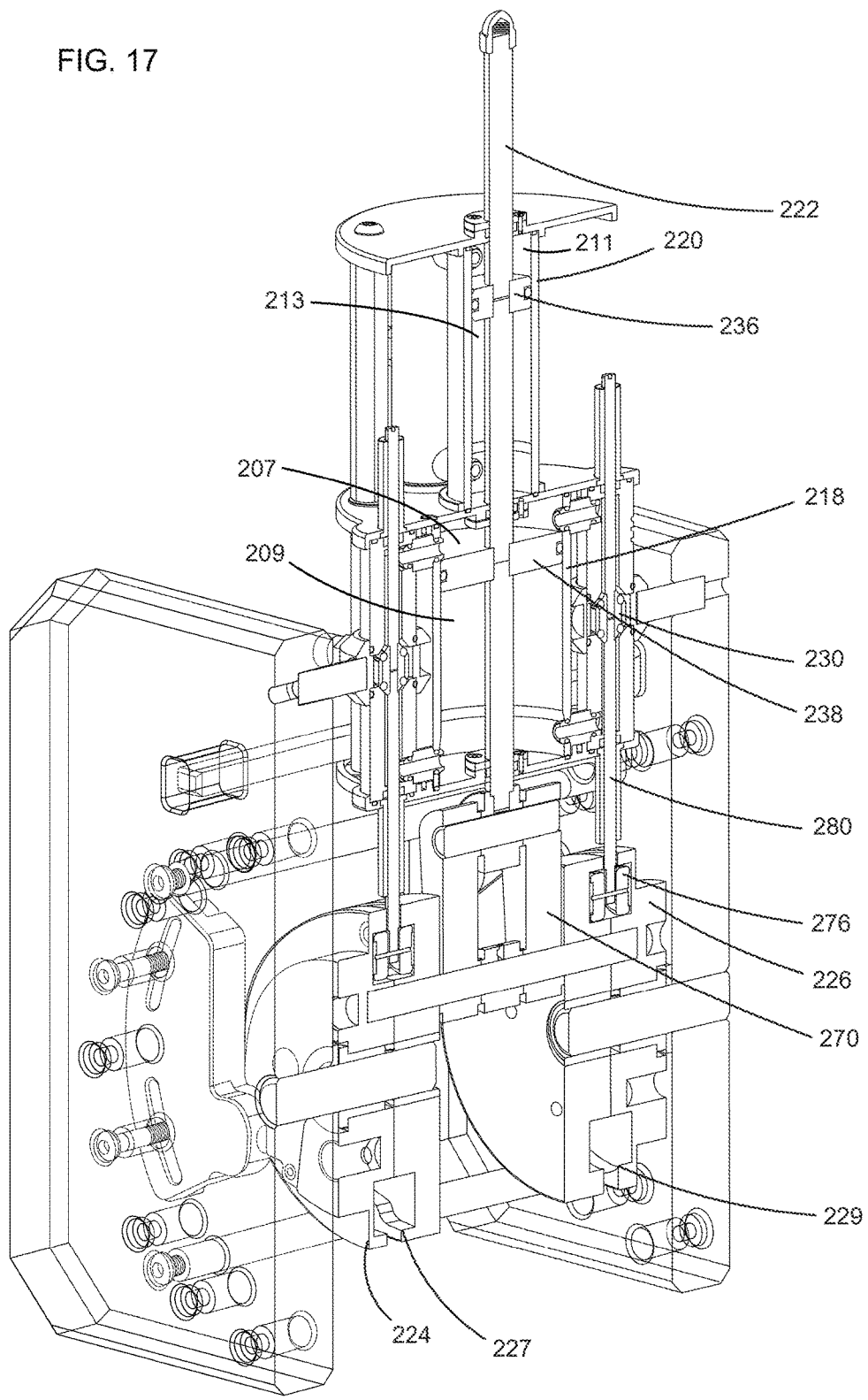
FIG. 17 is a cross-sectional perspective view of the dispensing device of FIG. 6 shown in the fourth position.
Figure 18:
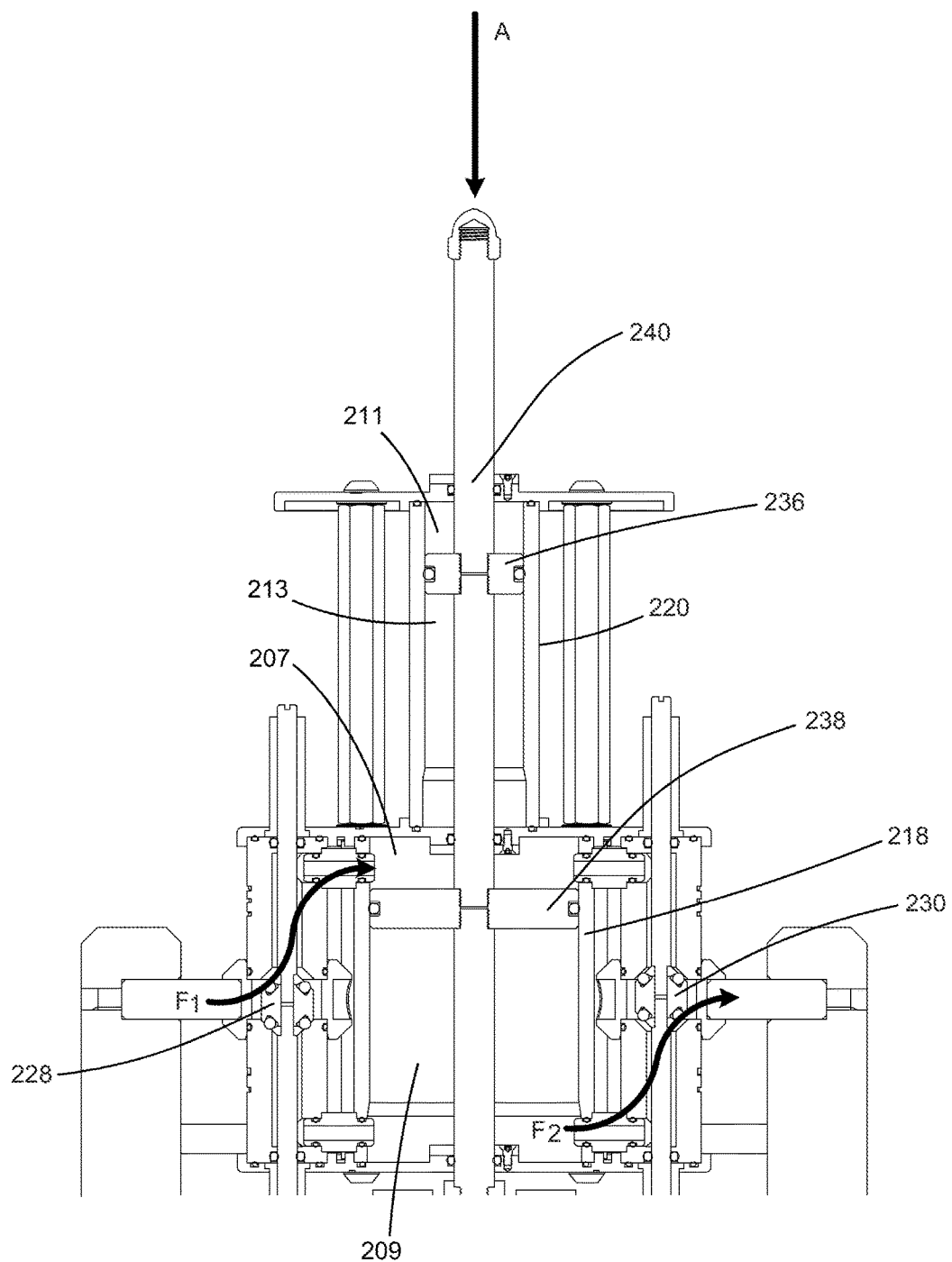
FIG. 18 is an enlarged cross-sectional side view of a portion of the dispensing device of FIG. 6 shown in the fourth position.

FIGS. 16-18 show the dispensing device 202 at the point where the piston rod 222, via the hinged arm 270, has rotated the first flywheel 224 into an orientation where the valve wheel 274 has moved into the second portion 245 of the groove 227, causing the inlet valve 228 to move from the up position to the down position, and simultaneously has rotated the second flywheel 226 into an orientation where the valve wheel 276 has moved into the first portion of the groove 229, causing the outlet valve 230 to move from the down position to the up position. As a result, carbonated water is allowed to follow flow path $F_3$ and enter the first interior region 207 of the first cylinder 218 above the piston 238, pushing the piston 238 downward. The downward movement of the piston 238 drives the carbonated water previously drawn into the second interior region 209 of the first cylinder 218 below the piston 238 during the portion of the stroke described in FIGS. 10-15 out of the first cylinder 218 along flow path $F_2$. The downward movement of the piston 238 drives the piston rod 222 in a downward direction, as shown by arrow A, causing the piston 236 to move downward simultaneously. As a result, concentrate is drawn into the interior region 207 of the concentrate cylinder 220 above the piston 236 and concentrate that was drawn into the interior region 207 of the concentrate cylinder 220 below the piston 236 during the portion of the stroke described in FIGS. 10-15 is driven out of the concentrate cylinder 220.

Figure 22:
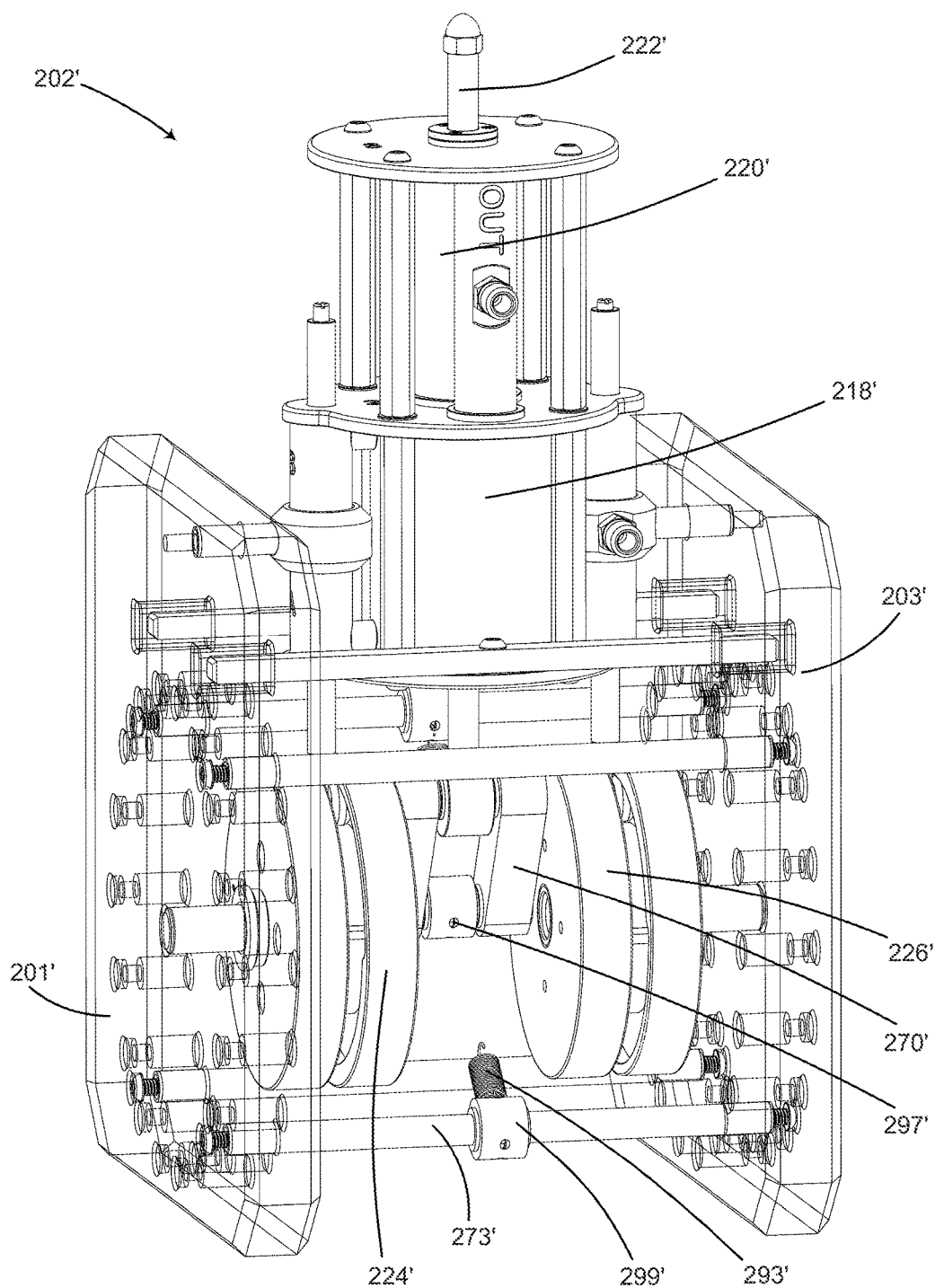
FIG. 22 is a perspective view of a dispensing device of a beverage dispensing system, according to another embodiment.
Figure 23:
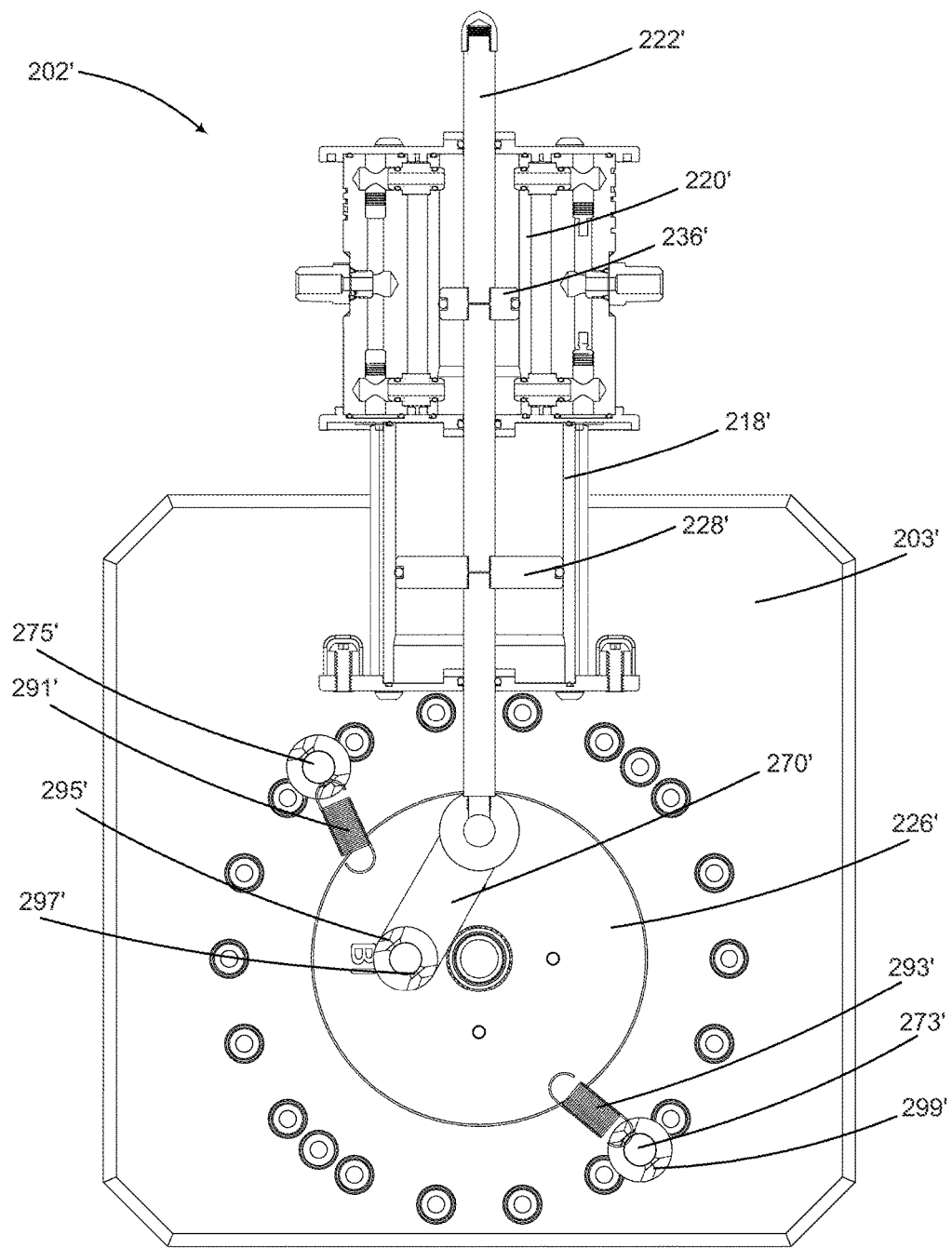
FIG. 23 is a cross-sectional side view of a portion of the dispensing device of FIG. 22.

As an alternative to the use of magnets, one or more springs can be used. For example, FIGS. 22 and 23 show a dispensing device 202' that can be included in the dispensing system 200 that includes springs 291', 293'. The dispensing device 202' can include the same as or similar features and/or functions as described above for the dispensing device 102 and the dispensing device 202, and therefore, certain features and functions will not be described in detail with respect to the dispensing system 202'. As with the previous embodiment, the dispensing device 202' provides a metering/control pump that includes two piston/cylinder assemblies that are joined together and operate in synchronized coordination with each other. As shown in FIG. 23, the dispensing device 202' includes a first cylinder 218', a second cylinder 220', and a piston rod 222'. The piston rod 222' is operatively coupled to the first cylinder 218' and the second cylinder 220'. The piston rod 222' is also operatively coupled to a flywheel assembly that includes a first flywheel 224' and a second flywheel 226'. The dispensing device 202' also includes springs 291', 293'. Springs 291', 293' can be connected to support rods 273' and 275' via couplers 299'. The support rods 273' are coupled to supports 201' and 203'. Although not shown, the springs 291', 293' can also be coupled to a hinged arm 270' via connection holes 295', 297', respectively. As shown in FIGS. 22 and 23 the springs 291', 293' are in a biased untensioned configuration. The springs 291', 293' can be pulled (e.g., tensioned) to couple the springs 291', 293' to the hinged arm 270'. Due to the connection of springs 291', 293' to the hinged arm 270', the springs 291', 293' can help to carry the rotation of flywheels 224', 226' forward from a "stall out" position, and hence the piston 238' through its cycle. In some embodiments, a combination of springs or magnets that are oriented to create either attractive or repulsive forces upon the corresponding features of the dispensing device 202' can be used either alone, or in concert with each other to ensure the "smooth" and continuous operation of the device and to prevent it from stalling out.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Although various embodiments have been described as having particular features and/or combinations of components, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. An apparatus comprising:
a first cylinder defining a first interior region and a second interior region separated by a first piston, the first cylinder configured to be coupled to a source of carbonated water, the first interior region of the first cylinder and the second interior region of the first cylinder configured to alternatingly contain a first volume of carbonated water and a second volume of carbonated water, respectively;
a second cylinder coupled to the first cylinder and defining a first interior region and a second interior region separated by a second piston, the second cylinder configured to be coupled to a source of beverage concentrate, the second piston operatively coupled to the first piston, the first interior region of the second cylinder and the second interior region of the second cylinder configured to alternatingly receive a first volume of beverage concentrate and a second volume of beverage concentrate, respectively; and
a dispenser including a flywheel assembly operatively coupled to the first piston, the dispenser configured to control a predetermined ratio of a volume of carbonated water from the first cylinder and a volume of beverage concentrate from the second cylinder to be dispensed simultaneously from the first cylinder and from the second cylinder, respectively, when a force is exerted on the first piston by a flow of carbonated water through the first cylinder.

2. The apparatus of claim 1, further comprising:
a mixer coupled to the first cylinder via a first inlet line and coupled to the second cylinder via a second outlet line, the mixer configured to combine the dispensed predetermined ratio of a volume of carbonated water via the first outlet line and the volume of beverage concentrate via the second outlet line and combine the dispensed predetermined ratio of a volume of carbonated water and the volume of beverage concentrate into a volume of mixed carbonated beverage that exits the mixer via a third line coupled to the mixer.

3. The apparatus of claim 1, further comprising:
a carbonated water intake line coupled to and in fluid communication with the source of carbonated water and coupled to and in fluid communication with the first cylinder; and
a pressure regulator coupled to the carbonated water intake line and configured to regulate a pressure of carbonated water flowing from the source of carbonated water and into the first cylinder.

4. The apparatus of claim 1, further comprising:
a first valve coupled to the first cylinder and configured to move from a first position in which a volume of carbonated water flows into the first interior region of the first cylinder and a second position in which a volume of carbonated water flows into the second interior region of the first cylinder; and
a second valve coupled to the first cylinder and configured to move from a first position in which a volume of carbonated water flows out of the first interior region of the first cylinder and a second position in which a volume of carbonated water flows out of the second interior region of the first cylinder.

5. The apparatus of claim 4, wherein the flywheel assembly includes a first flywheel coupled to the first valve and a second flywheel coupled to the second valve; and
the flywheel assembly configured to actuate the first valve to move between the first position and the second position of the first valve and actuate the second valve to move between the first position and the second position of the second valve when carbonated water flows through the first cylinder in at least one of the first interior region or the second interior region such that a force is exerted on the first piston causing the first piston to reciprocate within the first cylinder and actuate the first flywheel and the second flywheel.

6. The apparatus of claim 1, further comprising:
a first inlet valve coupled to the second cylinder and in fluid communication with the first interior region;
a second inlet valve coupled to the second cylinder and in fluid communication with the second interior region;

a first outlet valve coupled to the second cylinder and in fluid communication with the first interior region;

a second outlet valve coupled to the second cylinder and in fluid communication with the second interior region, the first inlet valve and the second inlet valve configured to alternatingly draw a volume of beverage concentrate into the first interior region and the second interior region of the second cylinder, respectively, while simultaneously the first outlet valve and the second outlet valve alternatingly draw a volume of beverage concentrate out of the first interior region and the second interior region of the second cylinder, respectively, when the second piston is actuated by the first piston.

7. The apparatus of claim 1, further comprising:

a container defining an interior region, the dispenser being disposed within the interior region of the container, the source of beverage concentrate containing the beverage concentrate being removably disposable within the interior region of the container.

8. The apparatus of claim 1, further comprising:

a first valve coupled to the first cylinder and configured to move between a first position in which a volume of carbonated water flows into the first interior region of the first cylinder and a second position in which a volume of carbonated water flows into the second interior region of the first cylinder;

a second valve coupled to the first cylinder and configured to move between a first position in which a volume of carbonated water flows out of the first interior region of the first cylinder and a second position in which a volume of carbonated water flows out of the second interior region of the first cylinder;

the flywheel assembly includes a first flywheel coupled to the first valve and a second flywheel coupled to the second valve; and the flywheel assembly configured to actuate the first valve to move between the first position and the second position of the first valve and to actuate the second valve to move between the first position and the second position of the second valve when carbonated water flows through the first cylinder in at least one of the first interior region or the second interior region of the first cylinder such that the force is exerted on the first piston causing the first piston to reciprocate within the first cylinder and actuate the first flywheel and the second flywheel, a predetermined volume of carbonated water being moved alternately into the first interior region and the second interior region of the first cylinder when the first valve is moved between the first position and the second position, while simultaneously a predetermined volume of carbonated beverage is being moved alternately out of the first interior region and the second interior region of the first cylinder when the second valve is moved between its first position and its second position, a predetermined volume of beverage concentrate being drawn alternately into the first interior region and the second interior region of the second cylinder while simultaneously a predetermined volume of beverage concentrate is being moved alternately out of the first interior region and the second interior region of the second cylinder when the second piston is actuated by the first piston.

9. The apparatus of claim 8, further comprising:

a mixer coupled to the first cylinder via a first inlet line and coupled to the second cylinder via a second outlet line, the mixer configured to combine the dispensed predetermined ratio of a volume of carbonated water via the first outlet line and the volume of beverage concentrate via the second outlet line and combine the dispensed predetermined ratio of a volume of carbonated water and the volume of beverage concentrate into a volume of mixed carbonated beverage that exits the mixer via a third line coupled to the mixer.

10. The apparatus of claim 8, further comprising:

a carbonated water intake line coupled to and in fluid communication with the source of carbonated water and coupled to and in fluid communication with the first cylinder; and a pressure regulator coupled to the carbonated water intake line and configured to regulate a pressure of carbonated water flowing from the source of carbonated water and into the first cylinder.

11. The apparatus of claim 8, further comprising:

a first inlet valve coupled to the second cylinder and in fluid communication with the first interior region;

a second inlet valve coupled to the second cylinder and in fluid communication with the second interior region;

a first outlet valve coupled to the second cylinder and in fluid communication with the first interior region;

a second outlet valve coupled to the second cylinder and in fluid communication with the second interior region, the first inlet valve and the second inlet valve configured to alternatingly draw a volume of beverage concentrate into the first interior region and the second interior region of the second cylinder, respectively, while simultaneously the first outlet valve and the second outlet valve alternatingly draw a volume of beverage concentrate out of the first interior region and the second interior region of the second cylinder, respectively, when the second piston is actuated by the first piston.

12. The apparatus of claim 8, further comprising:

a container defining an interior region, the dispenser being disposed within the interior region of the container, the source of beverage concentrate containing the beverage concentrate being removably disposable within the interior region of the container.

13. The apparatus of claim 12, further comprising:

a temperature gage coupled to the container and configured to measure a temperature within the interior region of the container.

* * * * *